US010860991B2

(12) United States Patent
Ikeuchi

(10) Patent No.: US 10,860,991 B2
(45) Date of Patent: Dec. 8, 2020

(54) MANAGEMENT SYSTEM, CONTROL METHOD THEREFOR, AND NON-TRANSITORY COMPUTER-READABLE MEDIUM

(71) Applicant: CANON KABUSHIKI KAISHA, Tokyo (JP)

(72) Inventor: Yuma Ikeuchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/169,465

(22) Filed: Oct. 24, 2018

(65) Prior Publication Data

US 2019/0139009 A1 May 9, 2019

(30) Foreign Application Priority Data

Nov. 9, 2017 (JP) ................. 2017-216551

(51) Int. Cl.
*G06K 5/00* (2006.01)
*G06Q 20/10* (2012.01)
*G06Q 20/04* (2012.01)
*G06Q 40/04* (2012.01)

(52) U.S. Cl.
CPC ............. *G06Q 20/10* (2013.01); *G06Q 20/04* (2013.01); *G06Q 40/04* (2013.01)

(58) Field of Classification Search
CPC .... G06Q 20/04; G06Q 20/10; G06Q 20/3829; G06Q 20/401; G06Q 20/40145; G06Q 40/04
See application file for complete search history.

(56) References Cited

U.S. PATENT DOCUMENTS

| 2012/0245987 A1* | 9/2012 | Isaacson | G06Q 30/02 705/14.23 |
| 2013/0060689 A1* | 3/2013 | Oskolkov | G06Q 20/10 705/42 |
| 2013/0060708 A1* | 3/2013 | Oskolkov | G06Q 20/10 705/75 |
| 2017/0193504 A1* | 7/2017 | Godsey | G06Q 20/405 |
| 2019/0043138 A1* | 2/2019 | Blake | G06Q 20/34 |
| 2019/0102392 A1* | 4/2019 | Tseretopoulos | G06Q 40/12 |

FOREIGN PATENT DOCUMENTS

JP 2011-13959 1/2011

* cited by examiner

Primary Examiner — Thien M Le
(74) Attorney, Agent, or Firm — Venable LLP

(57) ABSTRACT

A management system manages, for each of a plurality of users who use a social network service, account information, identification information associated with biological information, and a public key; sends, in accordance with an instruction related to money transfer to another user, a demand of authentication processing to the terminal of the user; receives, as a response to the demand, the identification information associated with the biological information and signature data created using a private key held in a storage unit having a tamper resistance in the terminal when the authentication processing using the biological information of the user succeeds; verifies, using the public key corresponding to the received identification information, the received signature data; and generates, based on a result of the verification, a message about the instruction.

6 Claims, 15 Drawing Sheets

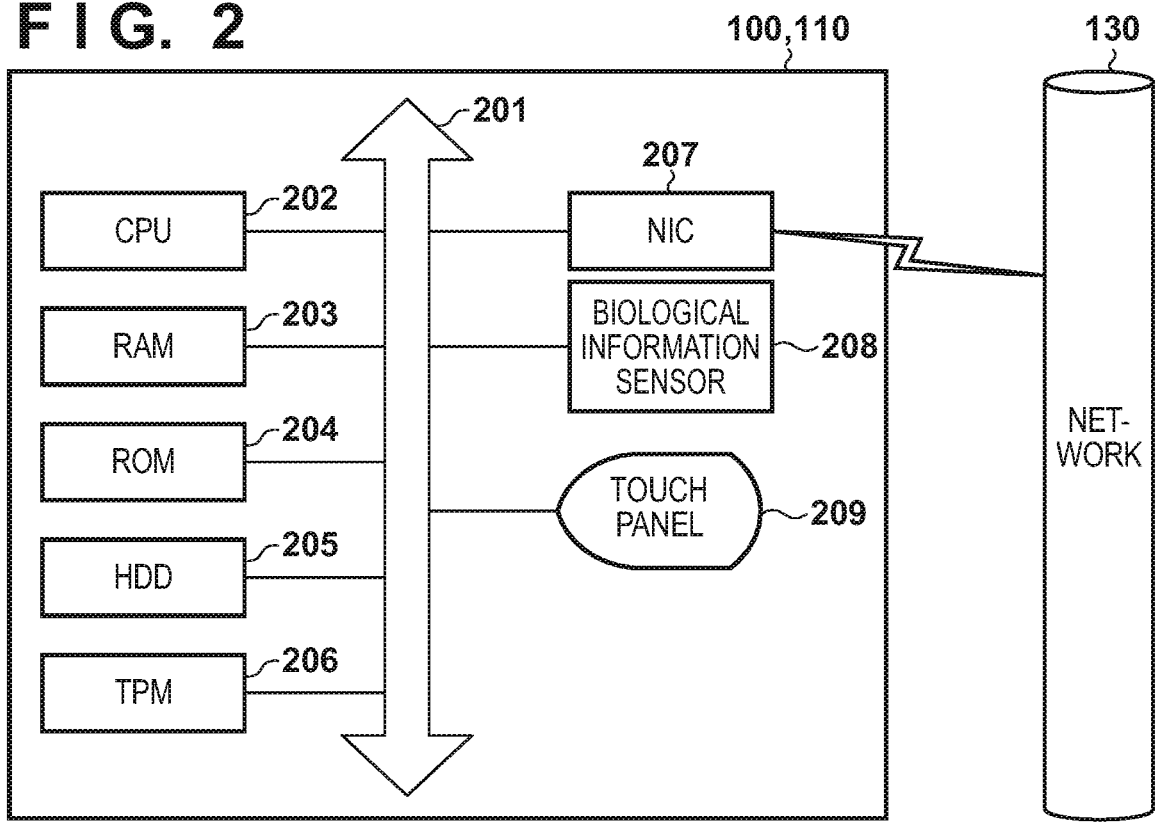
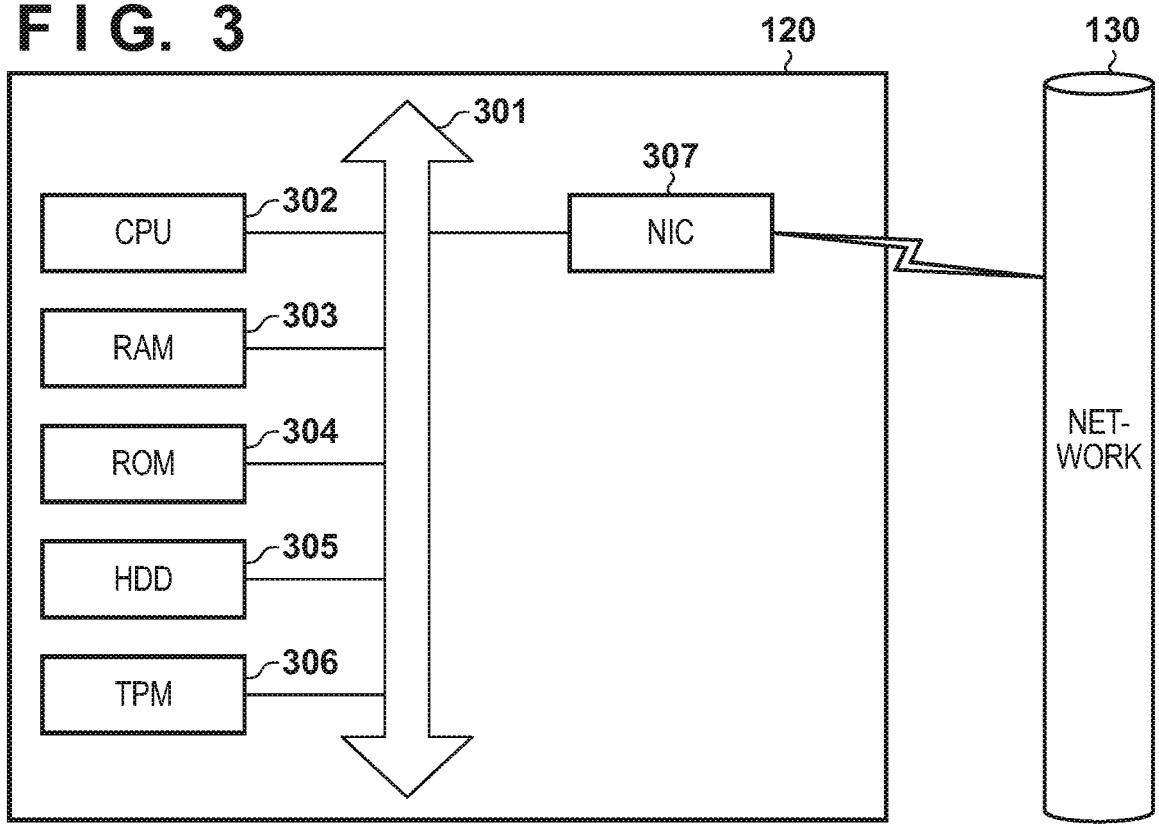

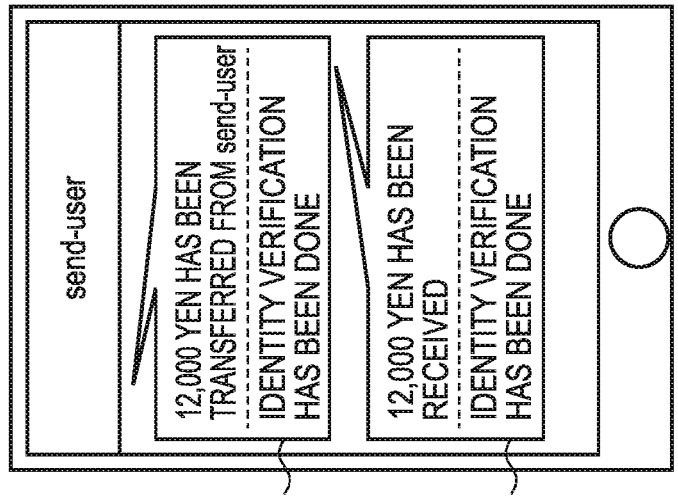
FIG. 5D  MONEY TRANSFER AMOUNT INPUT SCREEN
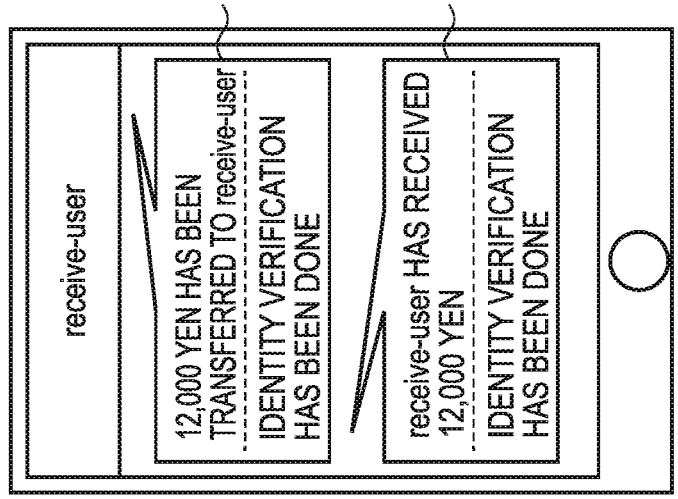
FIG. 5E  MONEY TRANSFER MESSAGE SCREEN
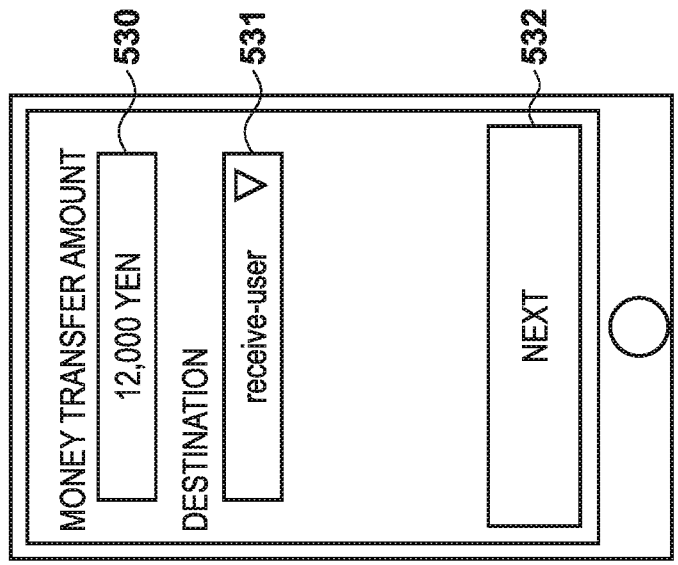
FIG. 5F  RECEPTION MESSAGE SCREEN

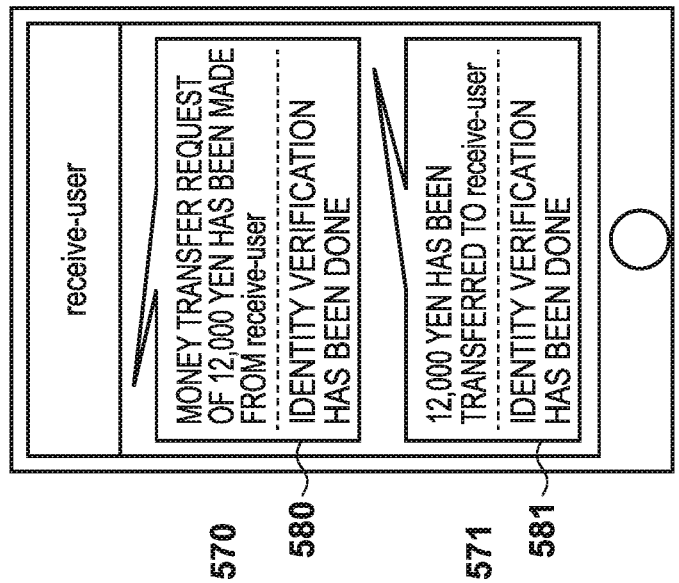
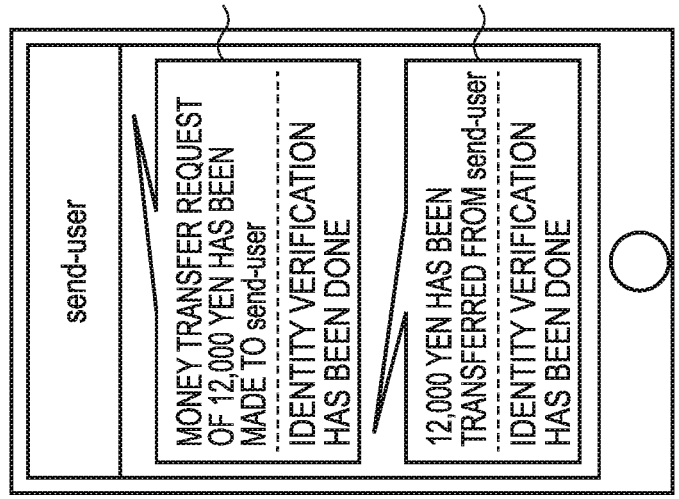
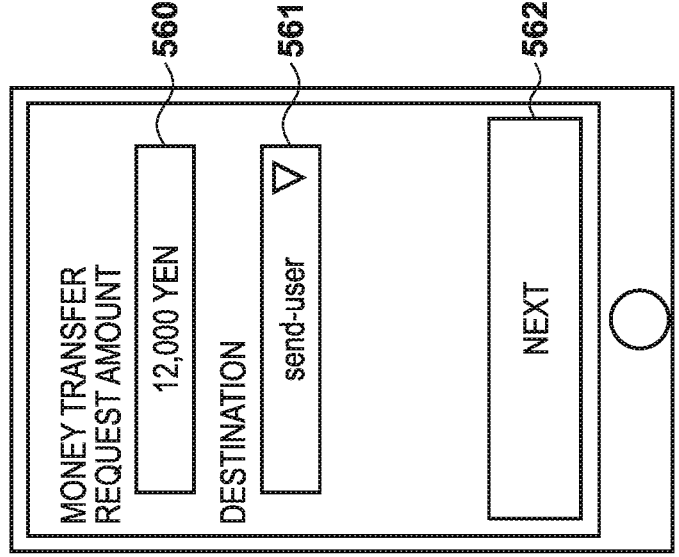

MONEY TRANSFER REQUEST INFORMATION INPUT SCREEN

MONEY TRANSFER REQUEST MESSAGE INPUT SCREEN

FACE PHOTO OBTAINING SCREEN

MONEY TRANSFER RESPONSE MESSAGE SCREEN

MONEY TRANSFER REQUEST INFORMATION CONFIRMATION SCREEN

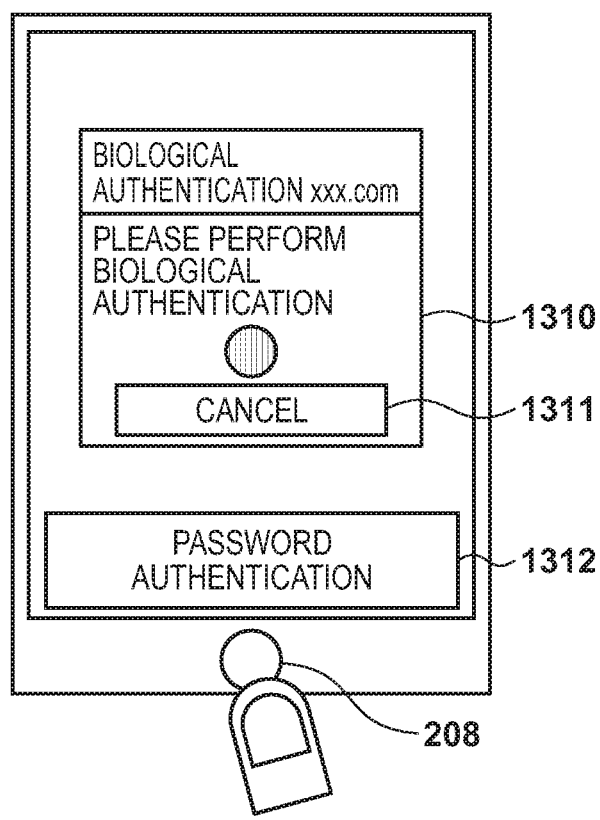

MANAGEMENT SYSTEM, CONTROL METHOD THEREFOR, AND NON-TRANSITORY COMPUTER-READABLE MEDIUM

BACKGROUND OF THE INVENTION

Field of the Invention

The present invention relates to a management system, a control method therefor, and a non-transitory computer-readable medium.

Description of the Related Art

In recent years, FIDO (Fast Identity Online) has received attention as a new authentication system including biological authentication. Information leakage is fatal for biological information such as a fingerprint or vein used for biological authentication since if the information leaks outside, the information cannot be rewritten unlike a password in ID/password authentication. To the contrary, in FIDO, an authentication operation is performed not on a server via the Internet but on a terminal of a user at hand. Therefore, the biological information never flows onto the network, and the risk of information leakage is low.

On the other hand, in recent years, many money transfer systems that make it possible to transfer and receive currency from a mobile terminal such as a smartphone are operated. In such systems, abuse cases occur, such as a fraud case in which an illegal money transfer request is made by spoofing and a blackmail case in which blackmail is done for a loan after money transfer is performed unilaterally. Since such cases have become widespread, the user who uses a money transfer system may wary of blackmail and fraud by spoofing, and avoid using an online money transfer function. According to Japanese Patent Laid-Open No. 2011-013959, when a money transfer source user and a money transfer destination user manage a common acceptance code, money transfer after performing identity verification of one another is implemented. This makes it possible to prevent erroneous money transfer and fraud by spoofing.

According to Japanese Patent Laid-Open No. 2011-013959, since the money transfer source user needs to share an acceptance code with the money transfer destination user by an arbitrary method such as a telephone or direct communication, there is a usability problem.

SUMMARY OF THE INVENTION

The present invention provides a technique capable of eliminating user's concerns when using an online money transfer function while improving convenience for both a money transfer source user and a money transfer destination user.

According to one aspect of the present invention, there is provided a management system that manages information pertaining to money transfer in cooperation with a social network service, comprising: a management unit configured to manage, for each of a plurality of users who use the social network service, in association with each other, account information, identification information associated with biological information of the user, and a public key generated when registering the biological information on a side of a terminal of the user; a demand unit configured to send, in accordance with an instruction related to money transfer by the user to another user, a demand of authentication processing to the terminal of the user; a reception unit configured to receive, as a response to the demand by the demand unit, the identification information associated with the biological information and signature data created using a private key held, in association with the biological information, in a storage unit having a tamper resistance in the terminal when the authentication processing using the biological information of the user succeeds on the side of the terminal of the user; a verification unit configured to verify, using the public key that corresponds to the identification information received by the reception unit and is managed by the management unit, the signature data received by the reception unit; a generation unit configured to generate, in accordance with a result of the verification of the verification unit, a message about the instruction related to the money transfer of the user; and a sending unit configured to send the message generated by the generation unit to the other user.

According to another aspect of the present invention, there is provided a control method for a management system that manages information pertaining to money transfer in cooperation with a social network service, the management system including a management unit configured to manage, for each of a plurality of users who use the social network service, in association with each other, account information, identification information associated with biological information of the user, and a public key generated when registering the biological information on a side of a terminal of the user, the method comprising: sending, in accordance with an instruction related to money transfer by the user to another user, a demand of authentication processing to the terminal of the user; receiving, as a response to the demand in the sending, the identification information associated with the biological information and signature data created using a private key held, in association with the biological information, in a storage unit having a tamper resistance in the terminal when the authentication processing using the biological information of the user succeeds on the side of the terminal of the user; verifying, using the public key that corresponds to the identification information received in the receiving and is managed by the management unit, the signature data received in the receiving; generating, in accordance with a result of the verification in the verifying, a message about the instruction related to the money transfer of the user; and sending the message generated in the generating to the other user.

According to another aspect of the present invention, there is provided a non-transitory computer-readable medium storing a program executed by a computer for communicating with a management system that manages information pertaining to money transfer in cooperation with a social network service, in the management system, account information of a user of the computer, who uses the social network service, identification information associated with biological information of the user, and a public key generated when registering the biological information on a side of a terminal of the user being managed in association with each other, the computer including a storage unit having a tamper resistance and configured to hold a private key associated with the biological information and generated together with the public key, the program causing the computer to function as: a sending unit configured to send an instruction related to money transfer by the user to another user; a reception unit configured to receive a demand of authentication processing including verification data from the management system; a creation unit configured to, if authentication processing using the biological information of the user succeeds, create signature data from the private key held in the storage unit and the verification data included in the demand; a response unit configured to send, as a response to the demand, the created signature data and the identification information associated with the biological information; and a display unit configured to display a message about the instruction related to the money transfer of the user, that is generated when the signature data is successfully verified using the public key corresponding to the private key in the management system.

According to the present invention, it is possible to eliminate user's concerns when using an online money transfer function while improving convenience for both a money transfer source user and a money transfer destination user.

Further features of the present invention will become apparent from the following description of exemplary embodiments (with reference to the attached drawings).

BRIEF DESCRIPTION OF THE DRAWINGS

FIG. 2 is a block diagram showing an example of the hardware arrangement of each of a money transfer source terminal and a money transfer destination terminal according to the present invention;

FIG. 3 is a block diagram showing an example of the hardware arrangement of a money transfer management server according to the present invention;

FIGS. 5A to 5I are views showing examples of the UIs of the money transfer source terminal and the money transfer destination terminal according to the first embodiment;

FIG. 13 is a view showing an example of the UI of each of a money transfer source terminal and a money transfer destination terminal according to the third embodiment.

DESCRIPTION OF THE EMBODIMENTS

Embodiments of the present invention will be described below with reference to the accompanying drawings.

First Embodiment

[Overall Arrangement of System]

Figure 1:
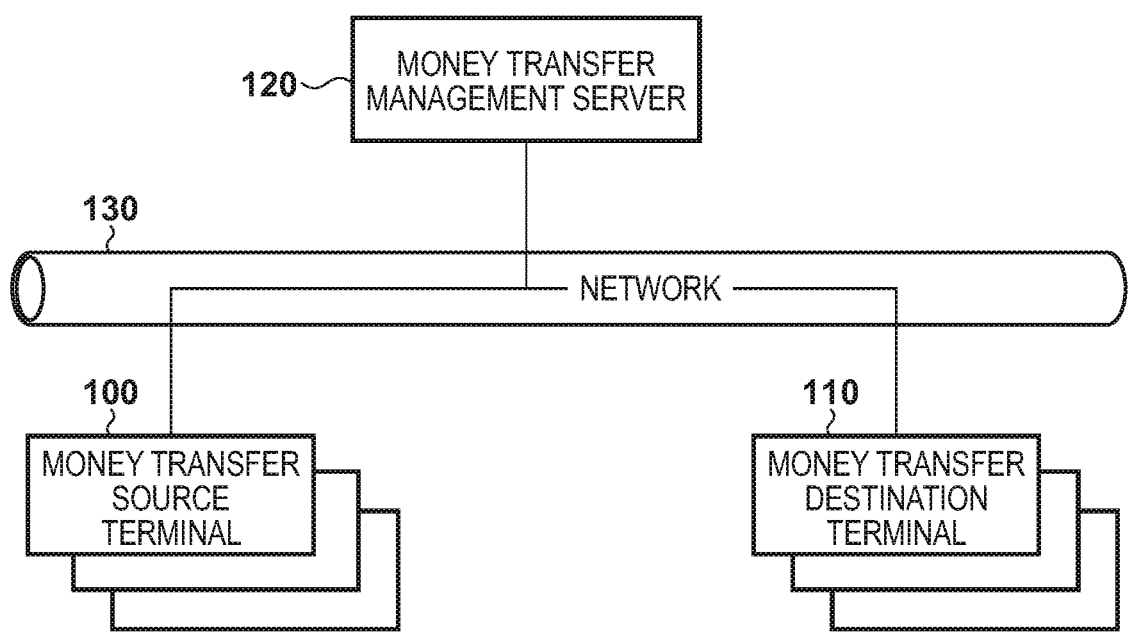
FIG. 1 is a block diagram showing an example of the overall arrangement of a system according to the present invention.

FIG. 1 is a block diagram showing an example of the overall arrangement of a system according to this embodiment.

In the system according to this embodiment, a money transfer source terminal 100, a money transfer destination terminal 110, and a money transfer management server 120 are connected via a network 130. The network 130 is, for example, a LAN, WAN, or dedicated digital line, such as the Internet, or a communication network implemented by a combination thereof.

The money transfer source terminal 100 and the money transfer destination terminal 110 are mobile terminals, and perform money transfer processing by communicating with the money transfer management server 120. Each of the money transfer source terminal 100 and the money transfer destination terminal 110 includes a sensor that obtains biological information for authenticating an individual, and operates a program for verifying the biological information and performing authentication. There may be a plurality of money transfer source terminals 100 and a plurality of money transfer destination terminals 110. Note that in this embodiment, the money transfer source terminal 100 issues, to the money transfer management server 120, a money transfer demand to the money transfer destination terminal 110. On the other hand, the money transfer destination terminal 110 issues, to the money transfer management server 120, a money transfer request demand and a reception demand to the money transfer source terminal 100. Note that the money transfer destination terminal and the money transfer source terminal are used for the sake of descriptive convenience, and does not mean a limitation that each terminal can perform only one of money transfer and reception. In addition, the money transfer source terminal 100 and the money transfer destination terminal 110 are connected in cooperation with various servers, thereby making it possible to use a social network service (SNS).

The money transfer management server 120 is a server computer that provides functions such as a money transfer function and a money transfer request function. Note that FIG. 1 shows only one money transfer management server 120. However, the money transfer management server 120 is not limited to this arrangement, and may be a management system formed by a plurality of housings in a distributed manner.

[Hardware Arrangement]

FIG. 2 is a block diagram showing an example of the hardware arrangement of each of the money transfer source terminal 100 and the money transfer destination terminal 110 according to this embodiment.

A system bus 201 controls the flow of data in the apparatus. Respective portions provided in the apparatus are communicably connected via the system bus 201. A CPU (Central Processing Unit) 202 controls the overall apparatus. The CPU 202 executes an application program, an OS (Operating System), and the like, which are stored in an HDD (Hard Disc Drive) 205. The CPU 202 executes control to temporarily store, in a RAM (Random Access Memory) 203, information, files, and the like necessary to execute the program.

The RAM 203 is a temporary storage unit, and functions as a main memory, a work area, or the like for the CPU 202. A ROM (Read Only Memory) 204 is a nonvolatile storage unit, and stores various data such as a basic I/O program. The HDD (Hard Disc Drive) 205 is one of external storage units, and functions as a mass memory to store application programs such as a Web browser, programs of a service server group, an OS, related programs, and the like.

A TPM (Trusted Platform Module) 206 is a storage unit (chip) having a tamper resistance for preventing stored data from being read externally for the purpose of processing or storing confidential information. In this embodiment, the TPM 206 is used by authenticators 420 and 450 (to be described later) to store a private key and the feature amount of biological information to be used for authentication.

The TPM 206 is a security chip functioning independently of the operating system (OS) and other hardware, and serves as a storage unit having a tamper resistance for processing/storing confidential information. In the present invention, the TPM 206 stores biological information (or the feature amount thereof) of the user to be used for biological authentication and a private key necessary for authentication processing (to be described later). Note that a method can also be adopted, in which a secure memory space separated from another space and operating on one chip to implement a tamper resistance is ensured in the terminal as a storage unit having a tamper resistance substituting as the TPM, and the biological information (or the feature amount thereof) of the user, the private key, and the like are managed in the memory space.

A NIC (Network Interface Card) 207 is used when the apparatus exchanges data with an external apparatus via the network 130.

A biological information sensor 208 is a sensor that reads the biological information of the user and, for example, reads information such as the fingerprint, iris, or vein of the user and converts it into a signal. In this embodiment, a fingerprint reading sensor and a camera will be exemplified as the biological information sensor 208. The present invention, however, is not limited to them, and another biological information sensor may be used. Alternatively, an arrangement may be adopted, in which when the user touches a touch panel 209 or inputs data, fingerprint information or face information may be read, and converted into an electrical signal. Furthermore, the kind of biological information is not limited to the above ones, and may be configured to be selectable by the user.

The touch panel 209 has two functions, that is, a display function and an input function, and displays the screen of an application, a keyboard, and the like and also outputs, as an information signal, touched screen position information when the user applies a pressure to the screen by a hand or a dedicated pen. When the application uses the output signal information, the user can operate the application via the touch panel 209.

Figure 4:
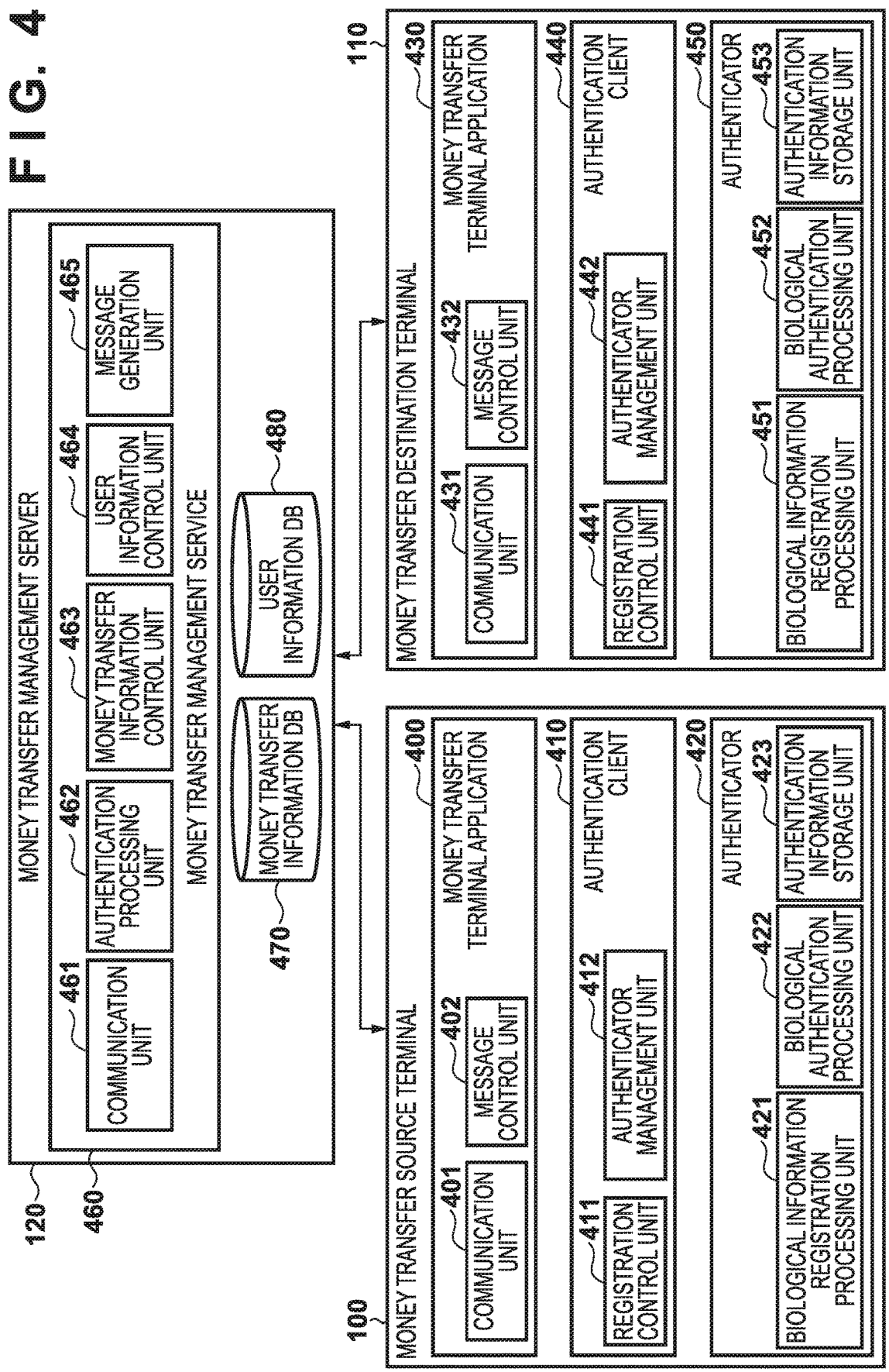
FIG. 4 is a block diagram showing an example of a software arrangement according to the present invention.

Note that the above arrangement is merely an example, and the present invention is not limited to the example of the arrangement shown in FIG. 2. For example, the storage destination of data or a program can be changed among the RAM 203, the ROM 204, and the HDD 205 in accordance with the feature of the data or program. Furthermore, the apparatus can include a USB interface. The biological information sensor 208 can be implemented by external hardware that is connected by USB. If the apparatus is a mobile phone or the like, it can include another component (not shown) such as a hardware component for a speech communication function. When the CPU 202 executes processing based on the program stored in the HDD 205, the software arrangement shown in FIG. 4 is implemented.

FIG. 3 is a block diagram showing an example of the hardware arrangement of the money transfer management server 120 according to this embodiment.

A system bus 301 controls the flow of data in the apparatus. Respective portions provided in the money transfer management server 120 are communicably connected via the system bus 301. A CPU 302 controls the overall apparatus. The CPU 302 executes an application program, an OS, and the like, which are stored in an HDD 305. In addition, the CPU 302 executes control to temporarily store, in a RAM 303, information, files, and the like necessary to execute the program.

The RAM 303 is a temporary storage unit, and functions as a main memory, a work area, or the like for the CPU 302. A ROM 304 is a nonvolatile storage unit, and stores various data such as a basic I/O program. The HDD 305 is one of external storage units, and functions as a mass memory to store application programs such as a Web browser, programs of a service server group, an OS, related programs, and the like.

A TPM 306 is a storage unit (chip) having a tamper resistance for preventing stored data from being read externally for the purpose of processing or storing confidential information. In this embodiment, the TPM 306 holds information which is registered in cooperation with the money transfer source terminal 100 or the money transfer destination terminal 110 connected via the network 130. A NIC 307 is used when the money transfer management server 120 exchanges data with an external apparatus via the network 130.

Note that the above arrangement is merely an example, and the present invention is not limited to the example of the arrangement shown in FIG. 3. For example, the storage destination of data or a program can be changed among the RAM 303, the ROM 304, and the HDD 305 in accordance with the feature of the data or program. Furthermore, the money transfer management server 120 can include a USB interface. When the CPU 302 executes processing based on the program stored in the HDD 305, the software arrangement shown in FIG. 4 is implemented.

[Software Arrangement]

FIG. 4 is a block diagram showing an example of a software arrangement according to this embodiment. FIG. 4 shows an arrangement in which the money transfer source terminal 100 and the money transfer destination terminal 110 are connected via the money transfer management server 120 to be able to send/receive data.

The arrangement of the money transfer source terminal 100 will be described first. The money transfer source terminal 100 includes a money transfer terminal application 400, an authentication client 410, and the authenticator 420. The money transfer terminal application 400 is stored in the HDD 205 of the money transfer source terminal 100, and executed by the CPU 202. The money transfer terminal application 400 includes a communication unit 401 and a message control unit 402. The communication unit 401 communicates with the money transfer management server 120 via the NIC 207. The message control unit 402 displays, on the touch panel 209, a money transfer-related message of the money transfer management server 120 received by the communication unit 401. Details of the money transfer-related message will be described later.

The authentication client 410 is stored in the HDD 205 of the money transfer source terminal 100, and executed by the CPU 202. The authentication client 410 includes a registration control unit 411 and an authenticator management unit 412. Note that in a system applied with FIDO, the authentication client 410 corresponds to a FIDO client. The FIDO client uses a well-known arrangement and a detailed description thereof will be omitted. The registration control unit 411 manages information necessary for authentication with the money transfer management server 120. The authenticator management unit 412 manages one or more authenticators. In this embodiment, the authenticator management unit 412 manages the authenticator 420.

The authenticator 420 is stored in the HDD 205 of the money transfer source terminal 100, and executed by the CPU 202. The authenticator 420 includes a biological information registration processing unit 421, a biological authentication processing unit 422, and an authentication information storage unit 423. The biological information registration processing unit 421 executes biological information registration processing. The biological information registration processing is processing of registering biological information input by the user, and details thereof will be described later. The biological authentication processing unit 422 executes biological authentication processing. The biological authentication processing is processing of determining, in accordance with biological information used, whether the biological information is valid, and details thereof will be described later. The authentication information storage unit 423 stores, in the TPM 206, as information necessary for authentication, information such as a private key paired with a public key, that is registered in the money transfer management server 120.

The arrangement of the money transfer destination terminal 110 will be described next. The money transfer destination terminal 110 includes a money transfer terminal application 430, an authentication client 440, and the authenticator 450. The money transfer terminal application 430, the authentication client 440, and the authenticator 450 are stored in the HDD 205 of the money transfer destination terminal 110, and executed by the CPU 202. The money transfer terminal application 430, the authentication client 440, and the authenticator 450 have the same arrangements of the money transfer terminal application 400, the authentication client 410, and the authenticator 420 of the money transfer source terminal 100, respectively. Therefore, a detailed description thereof will be omitted.

The arrangement of the money transfer management server 120 will be described next. The money transfer management server 120 includes a money transfer management service 460, a money transfer information DB 470, and a user information DB 480. The money transfer management service 460 is stored in the HDD 305 of the money transfer management server 120, and executed by the CPU 302. The money transfer management service 460 includes a communication unit 461, an authentication processing unit 462, a money transfer information control unit 463, a user information control unit 464, and a message generation unit 465.

The communication unit 461 communicates with the money transfer source terminal 100 and the money transfer destination terminal 110. The authentication processing unit 462 provides an authentication function necessary to use a money transfer-related function provided by the money transfer management server 120, and a function of registering information pertaining to authentication. The money transfer information control unit 463 manages the money transfer information DB 470, and controls information pertaining to money transfer processing of the money transfer source user and the money transfer destination user. The user information control unit 464 manages the user information DB 480, and controls information of a user who uses the money transfer management service 460. The message generation unit 465 generates a money transfer completion message to the money transfer source terminal 100 and a money transfer request message to the money transfer destination terminal 110. Note that these messages will be collectively referred to as money transfer-related messages hereinafter.

The money transfer information DB 470 is a database that manages information pertaining to money transfer between the terminals. The user information DB 480 is a database that manages information of a user who uses a money transfer service. The money transfer information DB 470 and the user information DB 480 are configured in, for example, the HDD 305 of the money transfer management server 120. Note that each database may be configured in a storage area provided outside the money transfer management server 120.

[User Interface]

FIGS. 5A to 5I are views showing examples of the arrangements of the UIs (User Interfaces) of the money transfer source terminal 100 and the money transfer destination terminal 110 according to this embodiment. Transition of a screen will be described along an operation procedure. In each of message screens shown in FIGS. 5A to 5I, a balloon from the left side indicates a message from a partner terminal, and a balloon from the right side indicates a message from a self terminal. In each message screen, a character string in an upper portion represents the user (user account) of the partner terminal.

Figure 5A:
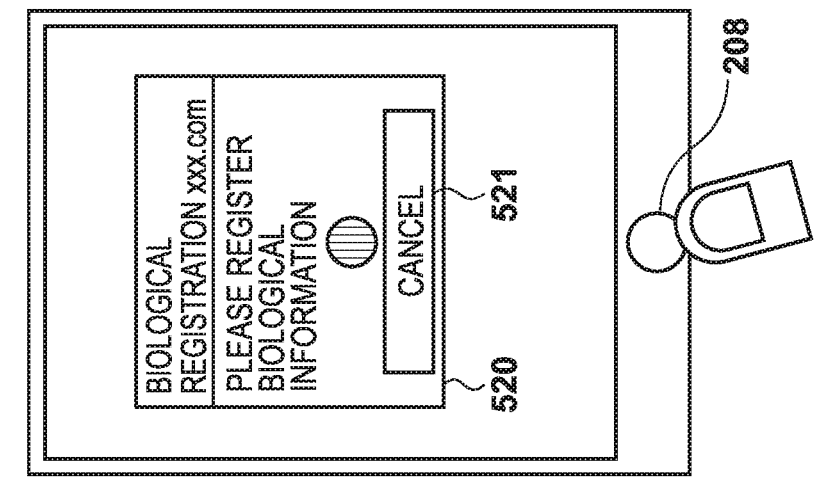

FIG. 5A shows an example of the arrangement of a menu selection screen. The menu selection screen is a screen drawn on the touch panel 209 when the money transfer terminal application 400 or 430 is activated. If a money transfer button 500 is tapped, the screen transits to a money transfer amount input screen shown in FIG. 5D. If a money transfer request button 501 is tapped, the screen transits to a money transfer request amount input screen shown in FIG. 5G. If a biological information registration button 502 is tapped, the screen transits to a biological authentication screen shown in FIG. 5B.

Figure 5B:
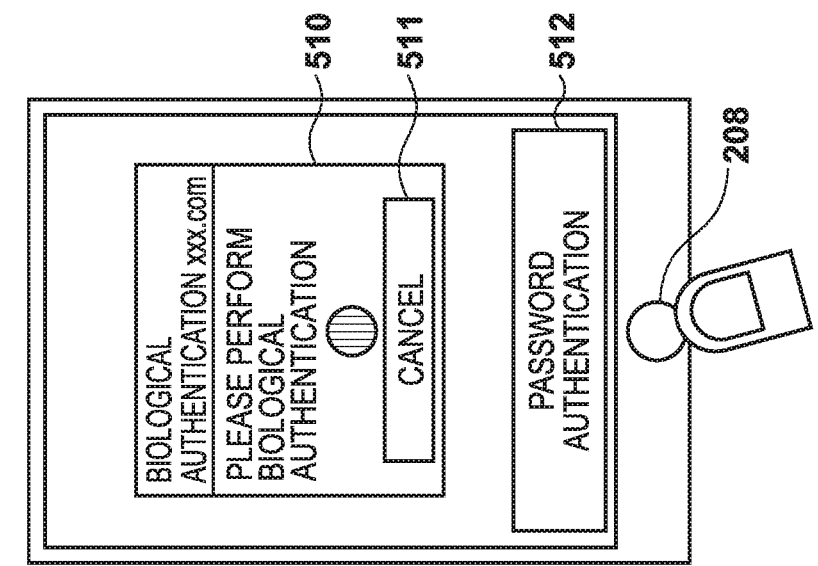
Figure 5C:
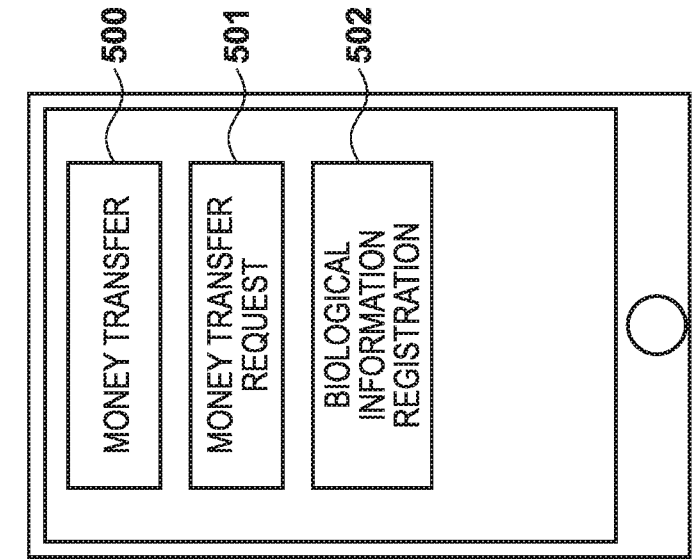

In the biological authentication screen shown in FIG. 5B, if authentication by already registered biological information or a password is normally completed, the screen transits to a biological registration screen shown in FIG. 5C. The biological authentication screen shown in FIG. 5B is a screen for obtaining authentication information in order for the money transfer terminal application 400 or 430 to use various money transfer functions, and is drawn on the touch panel 209. A biological information input instruction region 510 prompts the user to input biological information. At this time, when the user presents biological information to the biological information sensor 208, the biological information is obtained. If a cancel button 511 is tapped, the authentication processing is aborted, and the screen transits to the menu selection screen shown in FIG. 5A. If a password authentication button 512 is tapped, authentication is performed not by biological information but by a password.

The biological registration screen shown in FIG. 5C is a screen for registering biological information to be used to perform biological authentication, and is drawn on the touch panel 209. A biological information input instruction region 520 prompts the user to input biological information. At this time, when the user presents biological information to the biological information sensor 208, the biological information is obtained. If a cancel button 521 is tapped, the authentication processing is aborted, and the screen transits to the menu selection screen shown in FIG. 5A.

The money transfer amount input screen shown in FIG. 5D is a screen for inputting an amount of money to be transferred from the money transfer source user to the money transfer destination user, and is drawn on the touch panel 209. A money transfer amount input region 530 is a region for inputting an amount of money to be transferred. A money transfer destination selection region 531 is a region for selecting a money transfer destination. In this embodiment, the money transfer destination selection region 531 assumes that a user is selected in a pull-down form. However, a selection method is not particularly limited. For example, the user may designate a new money transfer destination. In this example, "receive-user" is designated as a money transfer destination. Note that a money transfer source user is explained as "send-user". If a next button 532 is tapped, the screen transits to the biological authentication screen shown in FIG. 5B. If biological authentication is normally completed in the biological authentication screen, the screen transits to a money transfer message screen shown in FIG. 5E.

The money transfer message screen shown in FIG. 5E is a screen on which processing associated with money transfer of the money transfer source user is displayed in a timeline message form, and is drawn on the touch panel 209 of the money transfer source terminal 100. Note that in the timeline message form, messages are displayed in time series. A money transfer source message 540 is a message representing that a money transfer notification is made to the money transfer destination terminal 110 of the money transfer destination user (in this example, "receive-user"). At this time, a text "identity verification has been done" is displayed if the money transfer source user (in this example, "send-user" who operates the money transfer source terminal 100) has performed biological authentication in the biological authentication screen of FIG. 5B displayed on the money transfer source terminal 100. On the other hand, if authentication by a password has been performed, this text is not displayed. Note that the text "identity verification has been done" which is displayed when biological authentication is normally completed is merely an example, and another text may be displayed. Another display form such as another font or another character size may be adopted. A reception notification message 541 is a message representing that the money transfer destination user (in this example, "receive-user" who operates the money transfer destination terminal 110) has completed reception. At this time, the text "identity verification has been done" is displayed if the money transfer destination user has performed biological authentication in the biological authentication screen of FIG. 5B displayed on the money transfer destination terminal 110, and is not displayed if authentication by a password has been performed.

A reception message screen shown in FIG. 5F is a screen on which processing associated with money transfer of the money transfer destination user is displayed in a timeline message form, and is drawn on the touch panel 209 of the money transfer destination terminal 110 when money transfer is performed from the money transfer source terminal 100. A money transfer destination message 550 is a message representing that money transfer has been performed from the money transfer source user (in this example, "send-user"). At this time, the text "identity verification has been done" is displayed if the money transfer source user (in this example, "send-user" who operates the money transfer source terminal 100) has performed biological authentication in the biological authentication screen of FIG. 5B displayed on the money transfer source terminal 100. On the other hand, if authentication by a password has been performed, this text is not displayed. If the money transfer destination message 550 is tapped, the screen transits to the biological authentication screen shown in FIG. 5B to perform reception. A reception source message 551 is a message representing that reception is complete. At this time, the text "identity verification has been done" is displayed if the money transfer destination user (in this example, "receive-user" who operates the money transfer destination terminal 110) has performed biological authentication in the biological authentication screen of FIG. 5B displayed on the above-described money transfer destination terminal 110. On the other hand, if authentication by a password has been performed, this text is not displayed.

A money transfer request amount input screen shown in FIG. 5G is a screen for inputting a money transfer request amount from the money transfer destination user to the money transfer source user, and is drawn on the touch panel 209. A money transfer request amount input region 560 is a region for inputting a money transfer request amount. A money transfer request destination selection region 561 is a region for selecting a destination to which a money transfer request is made. Note that in this embodiment, the money transfer request destination selection region 561 assumes that a user is selected in a pull-down form. However, a selection method is not particularly limited. For example, the user may designate a new money transfer request destination. In this example, "send-user" is designated as a money transfer request destination. Note that a money transfer request source user is "receive-user". If a next button 562 is tapped, the screen transits to the biological authentication screen shown in FIG. 5B. If biological authentication is normally completed in the biological authentication screen, the screen transits to a money transfer request message screen shown in FIG. 5H.

The money transfer request message screen shown in FIG. 5H is a screen on which processing associated with a money transfer request of the money transfer destination user is displayed in a timeline message form, and is drawn on the touch panel 209 of the money transfer destination terminal 110. A request source message 570 is a message representing that a money transfer request notification has been made to the money transfer source terminal 100 of the money transfer source user (in this example, "send-user"). At this time, the text "identity verification has been done" is displayed if the money transfer destination user (in this example, "receive-user" who operates the money transfer destination terminal 110) has performed biological authentication in the biological authentication screen of FIG. 5B displayed on the money transfer destination terminal 110. On the other hand, if authentication by a password has been performed, this text is not displayed. Contents of a request destination message 571 and an operation upon tapping the request destination message 571 are the same as those for the money transfer destination message 550 of the reception message screen of FIG. 5F and a detailed description thereof will be omitted.

A money transfer response message screen shown in FIG. 5I is a screen on which processing associated with a money transfer request of the money transfer source user is displayed in a timeline message form, and is drawn on the touch panel 209 of the money transfer source terminal 100 when the money transfer destination terminal 110 makes a money transfer request. A request source message 580 is a message representing that the money transfer destination user (in this example, "receive-user") has made the money transfer request. At this time, the text "identity verification has been done" is displayed if the money transfer destination user (in this example, "receive-user") has performed biological authentication in the biological authentication screen of FIG.

5B displayed on the money transfer destination terminal 110, and is not displayed if authentication by a password has been performed. If the request source message 580 is tapped, the screen transits to the biological authentication screen shown in FIG. 5B to perform money transfer. A request destination message 581 is the same as the money transfer source message 540 of the money transfer message screen of FIG. 5E, and a description thereof will be omitted.

[Biological Information Registration Processing]

Figure 6:
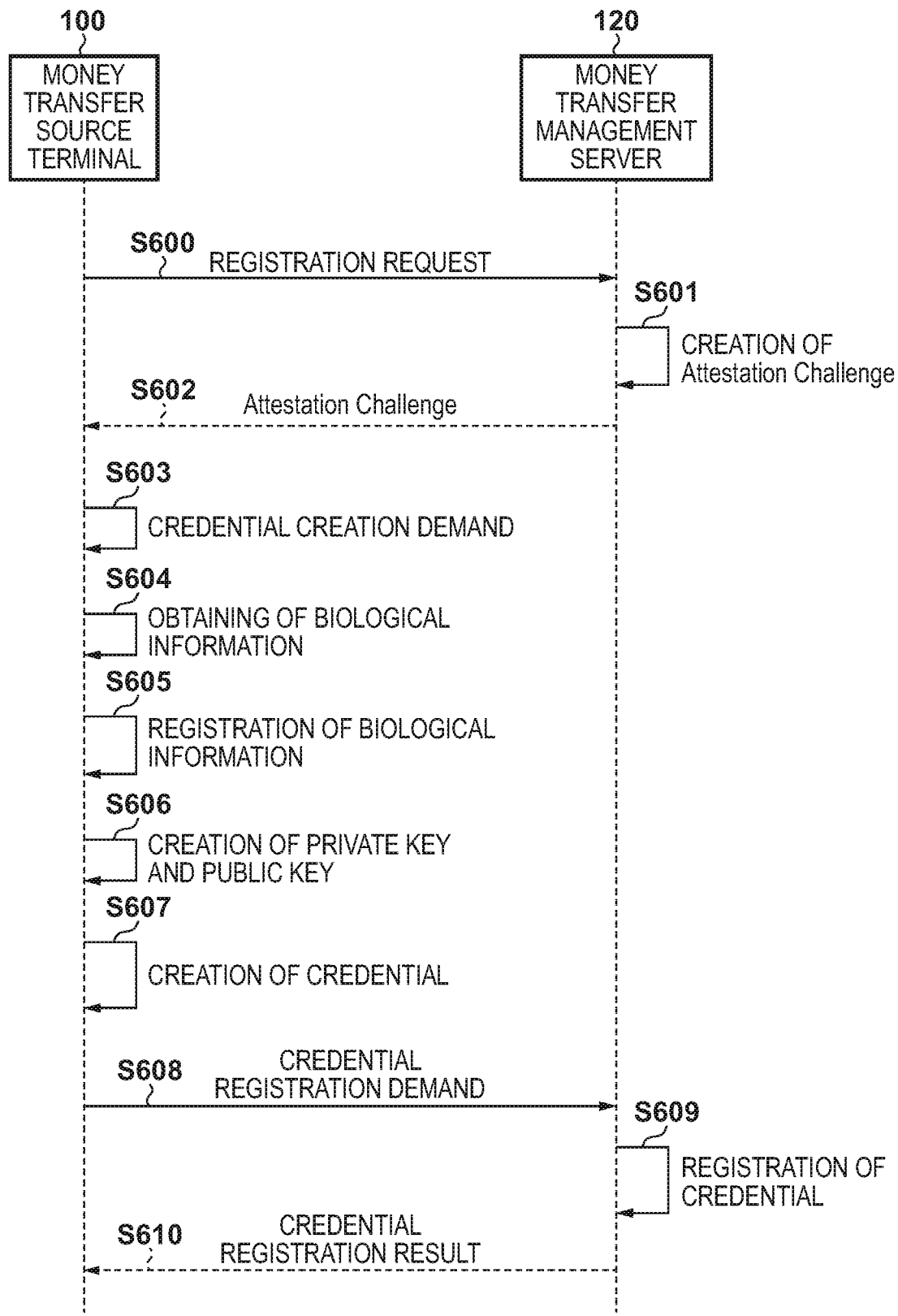
FIG. 6 is a sequence chart showing a biological information registration sequence according to the present invention.

FIG. 6 is a sequence chart showing a biological information registration sequence according to this embodiment. The biological information registration processing is processing of registering biological information necessary to perform biological authentication in the money transfer management service 460 used via the money transfer management server 120. Note that this embodiment will describe the biological information registration processing of the money transfer source user as the user who uses the money transfer source terminal 100. Assume, however, that the biological information registration processing of the money transfer destination user as the user who uses the money transfer destination terminal 110 can be performed in the same procedure. As a precondition, the money transfer source user has tapped the biological information registration button 502 in the menu selection screen shown in FIG. 5A and performed authentication by a password in the biological authentication screen shown in FIG. 5B.

Assume that each process is implemented when the CPU of the money transfer source terminal 100 or the money transfer management server 120 reads out the program stored in the ROM or the like and executes it.

In S600, the communication unit 401 of the money transfer terminal application 400 demands that the money transfer management server 120 registers biological information.

In S601, the communication unit 461 of the money transfer management service 460 receives a biological information registration demand from the money transfer terminal application 400, and the authentication processing unit 462 creates Attestation Challenge. Attestation Challenge is used as verification data for performing challenge response authentication. As Attestation Challenge, a random number or the like is used. However, a creation method is not particularly limited.

In S602, the communication unit 461 of the money transfer management service 460 returns, to the money transfer source terminal 100, information including Attestation Challenge created in S601.

In S603, the communication unit 401 of the money transfer terminal application 400 receives the information including Attestation Challenge. The authenticator management unit 412 of the authentication client 410 sends a credential creation demand to the authenticator 420. At the same time, the registration control unit 411 of the authentication client 410 displays the biological registration screen shown in FIG. 5C on the touch panel 209.

In S604, the money transfer source user presents biological information to the biological information sensor 208 in the biological registration screen (FIG. 5C). At this time, the biological information registration processing unit 421 of the authenticator 420 obtains the feature amount of the biological information of the money transfer source user. The feature amount of the biological information is obtained by converting information such as a fingerprint pattern unique to an individual into a value without degrading the uniqueness. Biological authentication is to specify an individual using the feature amount unique to the individual. As described above, information used for biological authentication is not particularly limited.

In S605, the biological information registration processing unit 421 of the authenticator 420 generates a biological information ID for uniquely identifying the biological information. After that, the authentication information storage unit 423 of the authenticator 420 stores the combination of the biological information ID and the biological information in the TPM 206.

In S606, the biological information registration processing unit 421 of the authenticator 420 creates a pair of a public key and a private key. The biological information registration processing unit 421 of the authenticator 420 creates an authentication information ID for uniquely identifying a combination of the biological information ID generated in S605 and the created private key, and the authentication information storage unit 423 stores the authentication information ID in the TPM 206. Table 1 shows an example of a table that is held in the TPM 206 and in which private keys are registered.

TABLE 1

| Authentication Information ID | Service ID | Biological Information ID | Private Key |
|---|---|---|---|
| 10001 | Remittabce-service.com | d493a744 | 1faea2da-a269-4fa7-812a-509470d9a0cb |
| 10002 | Remittabce-service.com | dcc97daa | d7ae30c8-3775-4706-8597-aaf681bc30f5 |
| 10003 | x-service.com | 51caacaa | 36ae5eed-732b-4b05-aa7b-4dddb4be3267 |
| ... | ... | ... | ... |

In Table 1, an authentication information ID column indicates an ID (identification information) unique to each piece of authentication information. A service ID column stores information of the top level domain and second level domain of the money transfer management service 460. This information may be received from the money transfer management server 120 together with Attestation Challenge in S602. A biological information ID column stores an ID corresponding to the feature amount of the biological information. A private key column stores a private key created as described above.

In S607, the biological information registration processing unit 421 of the authenticator 420 creates a credential. The credential includes the authentication information ID, the public key created in S606, and a signature. The signature is generated, using the private key created in S606, from Attestation Challenge received in S602.

In S608, the communication unit 401 of the money transfer terminal application 400 sends a credential registration demand to the money transfer management server 120. The credential registration demand includes, as a parameter, the credential created in S607.

In S609, the communication unit 461 of the money transfer management service 460 of the money transfer management server 120 receives the credential from the money transfer source terminal 100, and the authentication processing unit 462 executes processing of registering the credential. In the credential registration processing, the credential registration demand is verified by decoding the signature data included in the received credential using the public key included in the credential. If the credential registration demand can be verified, the authentication processing unit 462 registers, in the table in the user information DB 480, the combination of the authentication information ID, the public key, and a user ID included in the credential. The user ID corresponds to, for example, a user ID used for authentication by the password, that has been performed before the start of the processing sequence. Table 2 shows an example of a table in which credentials are registered.

TABLE 2

| Authentication Information ID | User ID | Public Key |
|---|---|---|
| 10001 | receive-user | AC43C5FB-BFA2-48D1-A71B-FB04ACDA347A |
| 10002 | send-user | 8143CA9F-35C9-4333-948F-BFCE66A74310 |
| ... | ... | ... |

In Table 2, a user ID column stores an ID for uniquely identifying a user who uses the money transfer management service 460. Note that in this embodiment, the user ID of the money transfer destination user is "receive-user", and the user ID of the money transfer source user is "send-user".

In S610, the communication unit 401 of the money transfer management service 460 returns the result of the credential registration processing executed in S609 to the money transfer source terminal 100. With the sequence of FIG. 6, the biological information registration processing is completed.

Note that although a detailed description is omitted, in the authentication processing by a password, account information (the user ID or the like) and a password may be held in association with each other on the server side and the server side may perform authentication using a user input to the terminal. As another arrangement of the authentication processing by a password, the terminal and the server may have the same tables as those shown in Tables 1 and 2 and the same procedure as that of authentication using biological information may be used. In this case, for example, the terminal side may hold the authentication information ID, the service ID, the user ID, the password, and the private key in association with each other. The server side may hold the authentication information ID, the user ID, and the public key in association with each other. The authentication processing performed upon the pressing of the password authentication button 512 of the biological authentication screen shown in FIG. 5B may be executed using the tables.

[Biological Authentication Processing]

Figure 7:
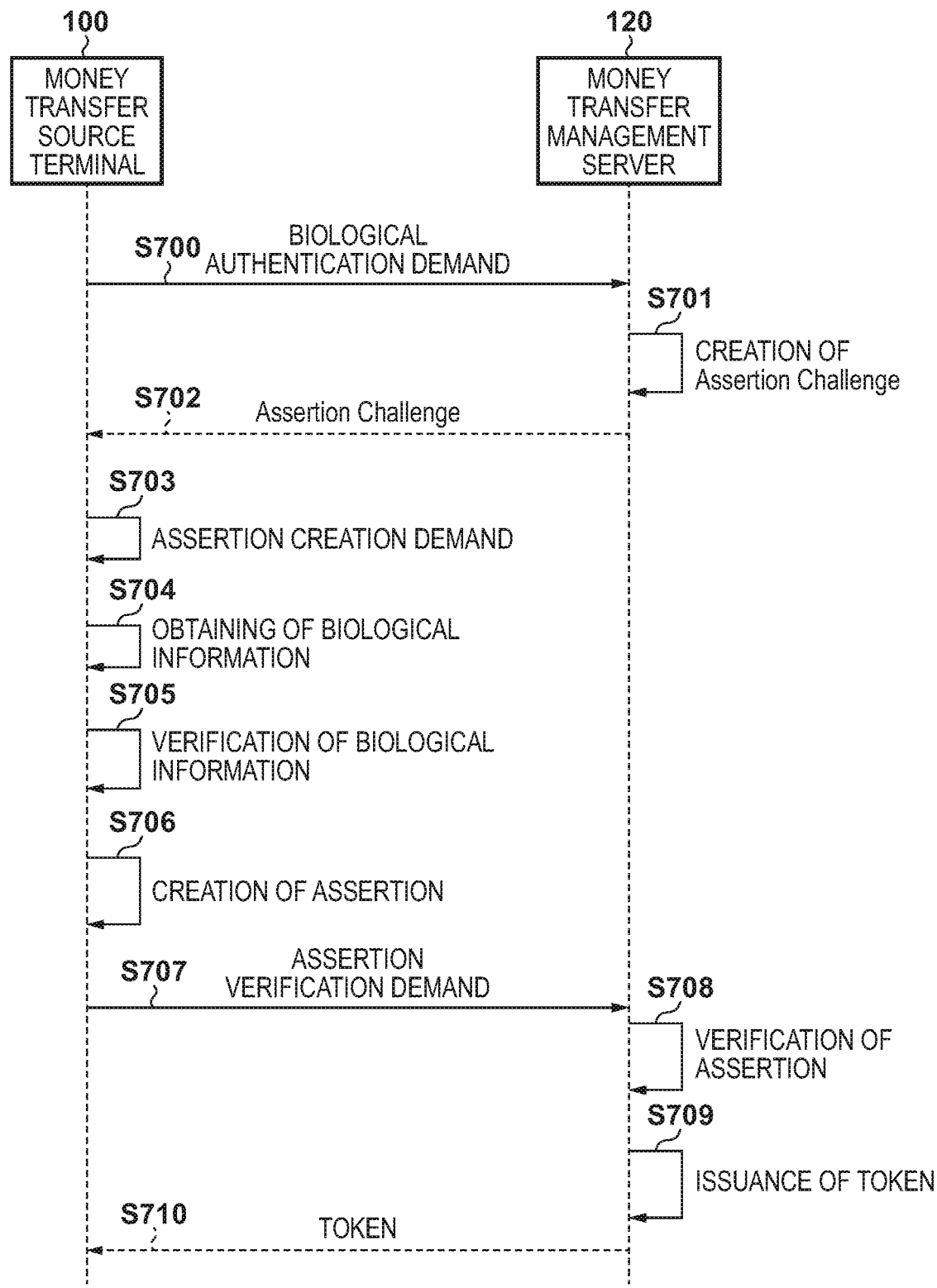
FIG. 7 is a sequence chart showing an authentication sequence by biological information according to the present invention.

FIG. 7 is a sequence chart showing an authentication sequence by biological information according to this embodiment. Note that in this embodiment, the biological authentication processing of the money transfer source user as the user who uses the money transfer source terminal 100 will be described. However, the biological authentication processing of the money transfer destination user as the user who uses the money transfer destination terminal 110 can also be performed in the same procedure. As a precondition, the money transfer source user executes the biological information registration processing sequence shown in FIG. 6 before executing this processing.

Assume that each process is implemented when the CPU of the money transfer source terminal 100 or the money transfer management server 120 reads out the program stored in the ROM or the like and executes it.

In S700, the communication unit 401 of the money transfer terminal application 400 of the money transfer source terminal 100 issues a biological authentication demand to the money transfer management server 120.

In S701, the communication unit 461 of the money transfer management service 460 of the money transfer management server 120 receives the biological authentication demand from the money transfer terminal application 400, and the authentication processing unit 462 creates Assertion Challenge. Assertion Challenge is data to be used to perform challenge response authentication. As Assertion Challenge, a random number or the like is used. However, a creation method is not particularly limited. Assertion Challenge is different from Attestation Challenge created in S601 of FIG. 6.

In S702, the communication unit 461 of the money transfer management service 460 returns, to the money transfer source terminal 100, information including Assertion Challenge created in S701.

In S703, the communication unit 401 of the money transfer terminal application 400 receives information including Assertion Challenge. Furthermore, the authenticator management unit 412 of the authentication client 410 sends an assertion creation demand to the authenticator 420. At the same time, the registration control unit 411 of the authentication client 410 displays the biological authentication screen shown in FIG. 5B on the touch panel 209 of the money transfer source terminal 100.

In S704, the money transfer source user presents biological information to the biological information sensor 208 in the biological authentication screen (FIG. 5B). At this time, the biological authentication processing unit 422 of the authenticator 420 obtains the feature amount of the biological information of the money transfer source user.

In S705, the biological authentication processing unit 422 of the authenticator 420 executes biological information verification processing. In the biological information verification processing, biological information matching that obtained in S704 is searched for from the pieces of biological information registered in the TPM 206, thereby obtaining the biological information ID of the matching biological information. Subsequently, information whose biological information ID and service ID match the obtained biological information ID and the service ID is searched for from the table (Table 1) stored in the TPM 206, thereby obtaining the authentication information ID and the private key of the matching information. If the authentication information can be specified uniquely, it is determined that biological authentication has succeeded, and the process advances to S706. On the other hand, if the authentication information cannot be specified uniquely, it is determined that biological authentication has failed, and this sequence ends. In this case, the sending source user may be notified of it.

In S706, the biological authentication processing unit 422 of the authenticator 420 creates an assertion. This assertion includes the authentication information ID obtained in S705 and signature data. The signature data is created, using the private key obtained in S705, from Assertion Challenge received in S702.

In S707, the communication unit 401 of the money transfer terminal application 400 sends an assertion verification demand to the money transfer management server 120. The assertion verification demand includes, as a parameter, the assertion created in S706.

In S708, the communication unit 461 of the money transfer management service 460 of the money transfer management server 120 receives the assertion from the money transfer source terminal 100, and the authentication processing unit 462 executes assertion verification processing. In the assertion verification processing, the credential whose authentication information ID matches that included in the received assertion is searched for from the table shown in Table 2, thereby obtaining the public key of the matching credential. Subsequently, the assertion is verified by decoding the signature data included in the received assertion using the public key. If the assertion can be verified, the process advances to S709. On the other hand, if the authentication information cannot be specified uniquely, the communication unit 461 of the money transfer management service 460 returns an error to the money transfer source terminal 100, and this sequence ends.

In S709, the authentication processing unit 462 of the money transfer management service 460 issues a token of the user for which the assertion can be verified in S708. The token is used by the user to use various functions such as the money transfer function and the money transfer request function.

In S710, the communication unit 461 of the money transfer management service 460 returns the token created in S709 to the money transfer source terminal 100. With the sequence shown in FIG. 7, the biological authentication processing is completed.

[Money Transfer Processing and Reception Processing]

Figure 8:
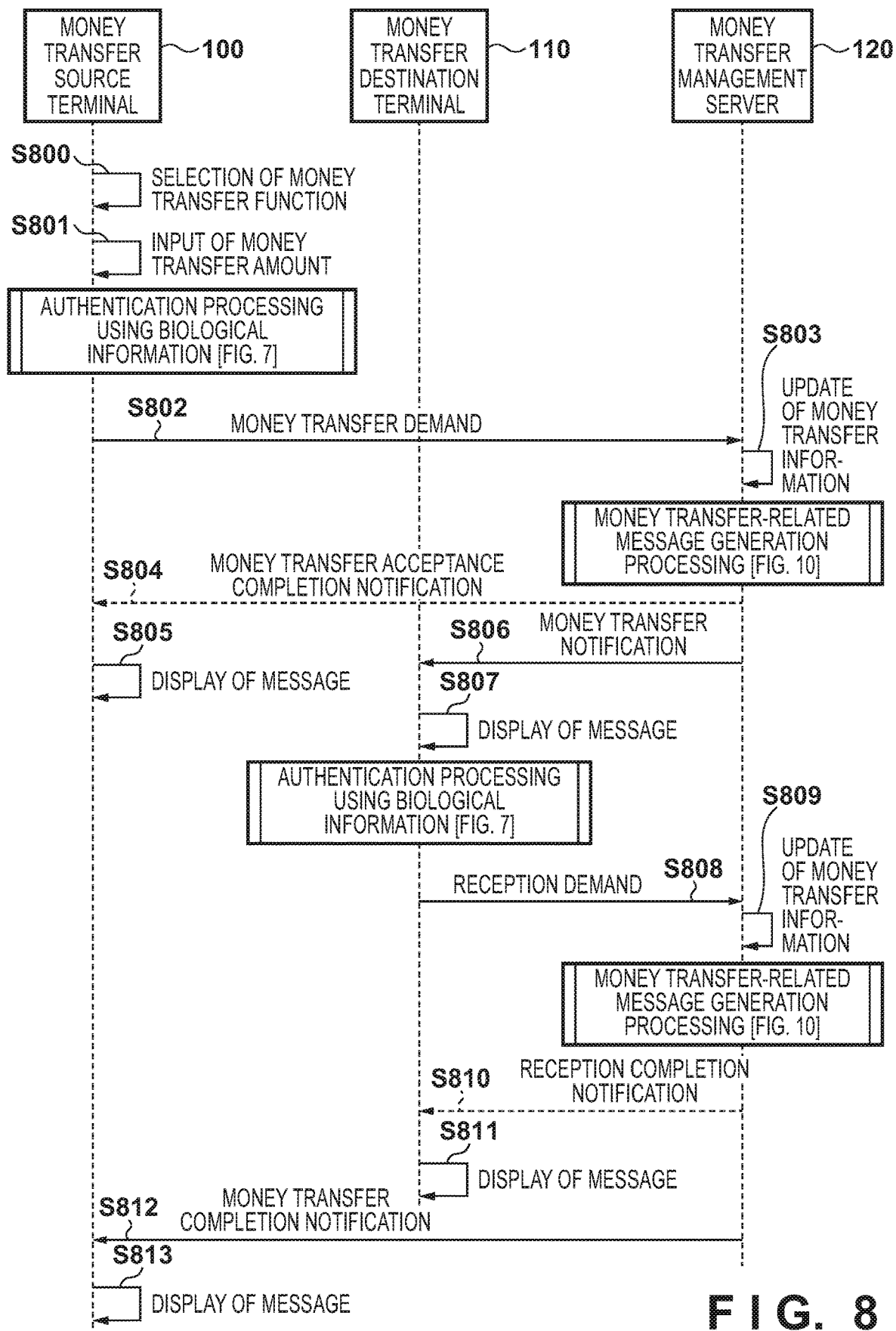
FIG. 8 is a sequence chart showing a sequence from money transfer processing to reception processing according to the first embodiment.

FIG. 8 is a sequence chart showing a sequence from money transfer processing by the money transfer source terminal 100 to reception processing by the money transfer destination terminal 110 according to this embodiment. As a precondition, the money transfer source user and the money transfer destination user execute the biological information registration processing sequence shown in FIG. 6 before executing this processing.

Assume that each process is implemented when the CPU of the money transfer source terminal 100, the money transfer destination terminal 110, or the money transfer management server 120 reads out the program stored in the ROM or the like and executes it.

In S800, when the money transfer source user taps the money transfer button 500 of the menu selection screen shown in FIG. 5A, the money transfer amount input screen shown in FIG. 5D is displayed on the touch panel 209 of the money transfer source terminal 100.

In S801, the money transfer source user inputs a money transfer amount to the money transfer amount input region 530 in the money transfer amount input screen (FIG. 5D), and selects a money transfer destination user in the money transfer destination selection region 531. Subsequently, when the money transfer source user taps the next button 532, the biological authentication screen (FIG. 5B) is displayed on the touch panel 209 of the money transfer source terminal 100. Note that in this embodiment, the money transfer source user inputs "12,000 yen" to the money transfer amount input region 530, and selects "money transfer destination user (receive-user)" in the money transfer destination selection region 531. With this user operation, the biological authentication sequence described with reference to FIG. 7 is executed.

After the biological authentication sequence is normally completed, the communication unit 401 of the money transfer terminal application 400 issues, in S802, a money transfer demand to the money transfer management server 120. At this time, the money transfer demand includes, as parameters, the money transfer amount input in S801, the money transfer destination user ID, and the token obtained in the sequence shown in FIG. 7.

In S803, the communication unit 461 of the money transfer management service 460 of the money transfer management server 120 receives the money transfer demand sent from the money transfer source terminal 100. Subsequently, the money transfer information control unit 463 updates the information of a money transfer information table in the money transfer information DB 470. Table 3 shows the state of the money transfer information table at the time of completion of S803.

TABLE 3

| Money Transfer Information ID | Money Transfer Source User ID | Money Transfer Destination User ID | Amount | Status |
|---|---|---|---|---|
| E1000 | send-user | receive-user | 12,000 | money transfer in progress |
| ... | ... | ... | ... | ... |

In Table 3, a money transfer information ID column indicates an ID unique to each piece of money transfer information. A money transfer source user ID column stores the ID of a user who performs money transfer. In this embodiment, "send-user" that is the ID of the money transfer source user as the user of the token included in the money transfer demand is stored. A money transfer destination user ID column stores the ID of the user who receives the money transfer. In this embodiment, "receive-user" that is the money transfer destination user ID included in the money transfer demand is stored. An amount column stores a money transfer amount in money transfer processing. In this embodiment, "12,000" as the money transfer amount included in the money transfer demand is stored. Assume that the currency unit is yen. A status column indicates the current situation in the series of money transfer processes. In this embodiment, a status "money transfer request in progress" is stored when a money transfer request is made, a status "money transfer in progress" is stored when money transfer is performed, and a status "received" is stored when the money transfer source and the money transfer destination perform mutual confirmation. Upon completion of S803, money transfer is performed, and thus "money transfer in progress" is stored. Note that this embodiment assumes the currency unit as yen. However, for example, if a plurality of currencies are dealt with, a unit may also be managed in association with the above data in Table 3. In this case, the currency unit may be input in the money transfer amount input screen shown in FIG. 5D. Date/time information obtained when the status or the like is updated may be additionally managed.

Subsequently, processing of generating a message for notifying the money transfer source terminal 100 and the money transfer destination terminal 110 that money transfer has been performed is executed. This processing will be described with reference to FIG. 10.

Figure 10:
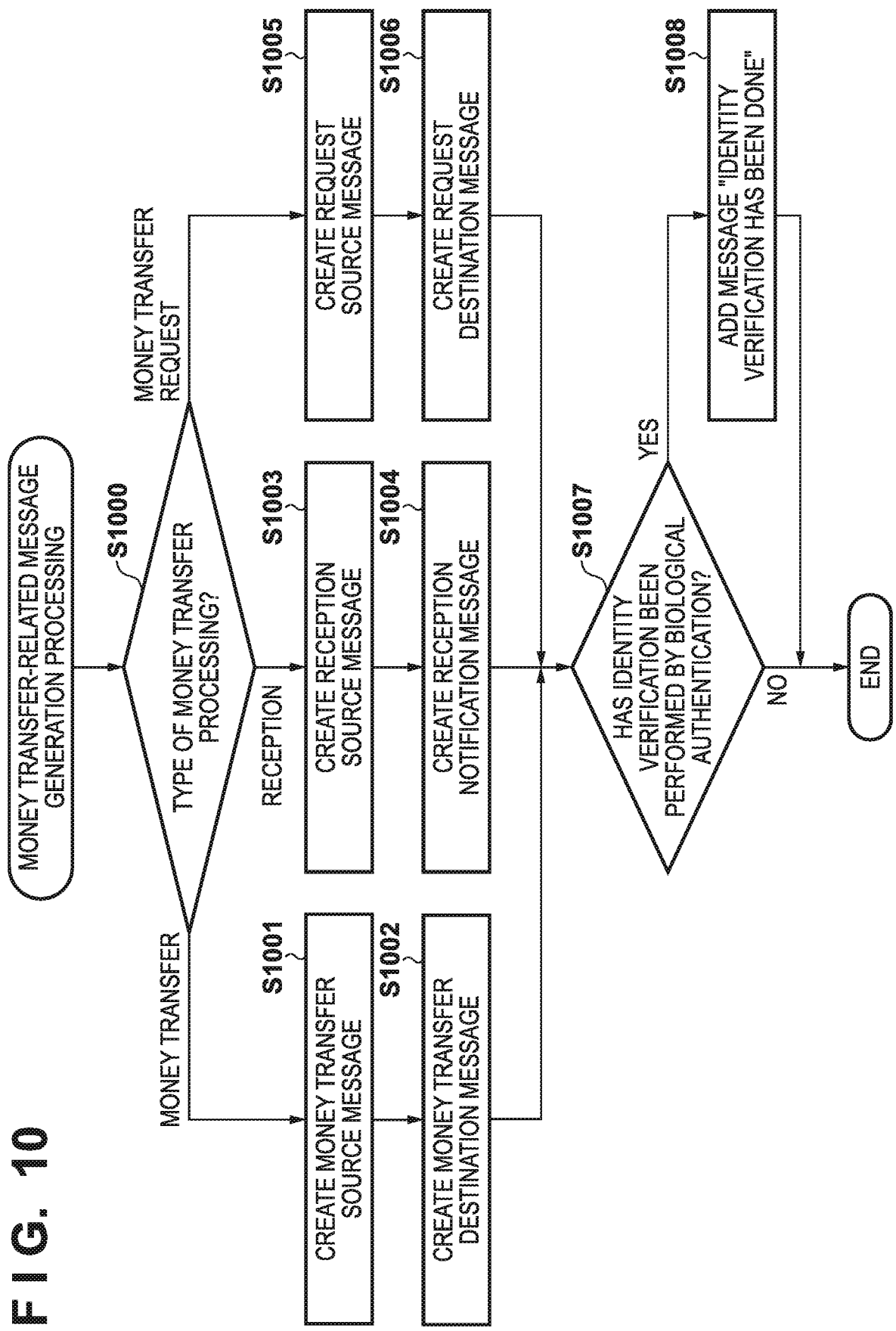
FIG. 10 is a flowchart illustrating money transfer-related message generation processing by a money transfer management server according to the present invention.

FIG. 10 is a flowchart illustrating the money transfer-related message generation processing by the money transfer management server 120 according to the present invention. This processing procedure is implemented when the CPU 302 of the money transfer management server 120 reads out the program stored in the ROM 304 or the like, and executes it.

In step S1000, the money transfer information control unit 463 of the money transfer management service 460 determines the type of the money transfer processing demanded from the money transfer source terminal 100 or the money transfer destination terminal 110. If the type of the demanded money transfer processing is "money transfer demand", the process advances to step S1001. If the type of the demanded money transfer processing is "reception demand", the process advances to step S1003. If the type of the demanded money transfer processing is "money transfer request demand", the process advances to step S1005.

In step S1001, the money transfer information control unit 463 of the money transfer management service 460 generates a message for notifying the money transfer source terminal 100, which has issued the money transfer demand, that the money transfer processing has been accepted. The generated message corresponds to the money transfer source message 540 shown in FIG. 5E or the request destination message 581 shown in FIG. 5I but is not added with the text "identity verification has been done" at this time.

In step S1002, the money transfer information control unit 463 of the money transfer management service 460 generates a message for notifying the money transfer destination terminal 110 that money transfer has been performed. The generated message corresponds to the money transfer destination message 550 shown in FIG. 5F or the request destination message 571 shown in FIG. 5H but is not added with the text "identity verification has been done" at this time. After that, the process advances to step S1007.

In step S1003, the money transfer information control unit 463 of the money transfer management service 460 generates a message for notifying the money transfer destination terminal 110, which has issued the reception demand, that reception is complete. The generated message corresponds to the reception source message 551 shown in FIG. 5F but is not added with the text "identity verification has been done" at this time.

In step S1004, the money transfer information control unit 463 of the money transfer management service 460 generates a message for notifying the money transfer source terminal 100 that reception has been performed. The message corresponds to the reception notification message 541 shown in FIG. 5E but is not added with the text "identity verification has been done" at this time. After that, the process advances to step S1007.

In step S1005, the money transfer information control unit 463 of the money transfer management service 460 generates a message for notifying the money transfer destination terminal 110, which has made the money transfer request, that the money transfer request processing has been accepted. The message corresponds to the request source message 570 shown in FIG. 5H but is not added with the text "identity verification has been done" at this time.

In step S1006, the money transfer information control unit 463 of the money transfer management service 460 generates a message for notifying the money transfer source terminal 100 that the money transfer request has been made. The message corresponds to the request source message 580 shown in FIG. 5I but is not added with the text "identity verification has been done" at this time. After that, the process advances to step S1007.

In step S1007, the money transfer information control unit 463 of the money transfer management service 460 refers to the token issued by the authentication processing using the biological information. The money transfer information control unit 463 determines whether the user of the money transfer source terminal 100 or the money transfer destination terminal 110 demands the money transfer-related processing after identity verification is performed by biological authentication. If it is determined that identity verification has been performed (YES in step S1007), the process advances to step S1008; otherwise (NO in step S1007), this processing procedure ends.

In step S1008, the money transfer information control unit 463 of the money transfer management service 460 adds the text "identity verification has been done" to the message generated in each of steps S1001 to S1006. Then, the processing procedure ends.

Referring back to the sequence shown in FIG. 8, assume that after the processing in S803, it is determined in step S1000 of FIG. 10 that the type of the money transfer processing is "money transfer demand", and it is determined in step S1007 that identity verification has been performed.

In S804, the communication unit 461 of the money transfer management service 460 returns a money transfer acceptance completion notification to the money transfer source terminal 100. The money transfer acceptance completion notification includes the money transfer source message added with the text "identity verification has been done", that has been generated in FIG. 10, and the money transfer information ID generated in S803.

In S805, the communication unit 401 of the money transfer terminal application 400 receives the money transfer acceptance completion notification from the money transfer management server 120. Furthermore, the message control unit 402 displays the money transfer source message 540 of the money transfer message screen shown in FIG. 5E on the touch panel 209 of the money transfer source terminal 100.

In S806, the communication unit 461 of the money transfer management service 460 of the money transfer management server 120 sends a money transfer notification to the money transfer destination terminal 110. The money transfer notification includes the money transfer destination message added with the text "identity verification has been done", that has been generated in FIG. 10, and the money transfer information ID generated in S803.

In S807, a communication unit 431 of the money transfer terminal application 430 of the money transfer destination terminal 110 receives the money transfer notification from the money transfer management server 120. Furthermore, a message control unit 432 displays the money transfer destination message 550 of the reception message screen shown in FIG. 5F on the touch panel 209 of the money transfer destination terminal 110. By confirming the text "identity verification has been done" of the money transfer destination message 550, the money transfer destination user can be assured that the money transfer source user has performed biological authentication and then performed money transfer. Subsequently, when the money transfer destination user taps the money transfer destination message 550 of the reception message screen shown in FIG. 5F, the biological authentication screen shown in FIG. 5B is displayed on the touch panel 209 of the money transfer destination terminal 110. After that, the biological authentication sequence described with reference to FIG. 7 is executed based on a user operation.

In S808, the communication unit 431 of the money transfer terminal application 430 issues a reception demand to the money transfer management server 120. At this time, the reception demand includes, as parameters, the money transfer information ID received in S807 and the token obtained in the sequence shown in FIG. 7.

In S809, the communication unit 461 of the money transfer management service 460 of the money transfer management server 120 receives the reception demand sent from the money transfer destination terminal 110. Subsequently, the money transfer information control unit 463 updates the information of the money transfer information table in the money transfer information DB 470. Table 4 shows the state of the money transfer information table at the time of completion of S809.

TABLE 4

| Money Transfer Information ID | Money Transfer Source User ID | Money Transfer Destination User ID | Amount | Status |
|---|---|---|---|---|
| E1000 | send-user | receive-user | 12,000 | received |
| ... | ... | ... | ... | ... |

In Table 4, the money transfer information control unit 463 of the money transfer management service 460 searches for, from the money transfer information ID column, information whose money transfer information ID matches that included in the reception demand, and updates the status column of the matching money transfer information to "received".

After that, to generate a message for notifying the money transfer source terminal 100 and the money transfer destination terminal 110 that reception has been performed, the processing shown in FIG. 10 is executed. Note that this embodiment will provide the following description by assuming that, after the processing in S809, it is determined in step S1000 of FIG. 10 that the type of the money transfer processing is "reception demand" and it is determined in step S1007 that identity verification has been performed.

In S810, the communication unit 461 of the money transfer management service 460 sends a reception completion notification to the money transfer destination terminal 110. The reception completion notification includes the reception source message added with the text "identity verification has been done", that has been generated in FIG. 10.

In S811, the communication unit 431 of the money transfer terminal application 430 of the money transfer destination terminal 110 receives the reception completion notification from the money transfer management server 120. Furthermore, the message control unit 432 displays the reception source message 551 of the reception message screen shown in FIG. 5F on the touch panel 209 of the money transfer destination terminal 110.

In S812, the communication unit 461 of the money transfer management service 460 of the money transfer management server 120 sends a money transfer completion notification to the money transfer source terminal 100. The money transfer completion notification includes the reception notification message added with the text "identity verification has been done", that has been generated in FIG. 10.

In S813, the communication unit 401 of the money transfer terminal application 400 of the money transfer source terminal 100 receives the reception completion notification from the money transfer management server 120. Furthermore, the message control unit 402 displays the reception notification message 541 of the money transfer message screen shown in FIG. 5E on the touch panel 209 of the money transfer source terminal 100. By confirming the text "identity verification has been done" of the reception notification message 541, the money transfer source user can be assured that the money transfer destination user has performed biological authentication and then received currency.

With the sequence shown in FIG. 8, the sequence from the money transfer processing by the money transfer source terminal 100 to the reception processing by the money transfer destination terminal 110 is completed. The money transfer source user and the money transfer destination user can transfer and receive currency after performing identity verification of one another by only performing operations on the terminals. Therefore, it is possible to improve safety when using the online money transfer function while achieving high usability. Furthermore, it is possible to reduce inhibition against the online money transfer function.

[Money Transfer Request Processing and Money Transfer Processing]

Figure 9:
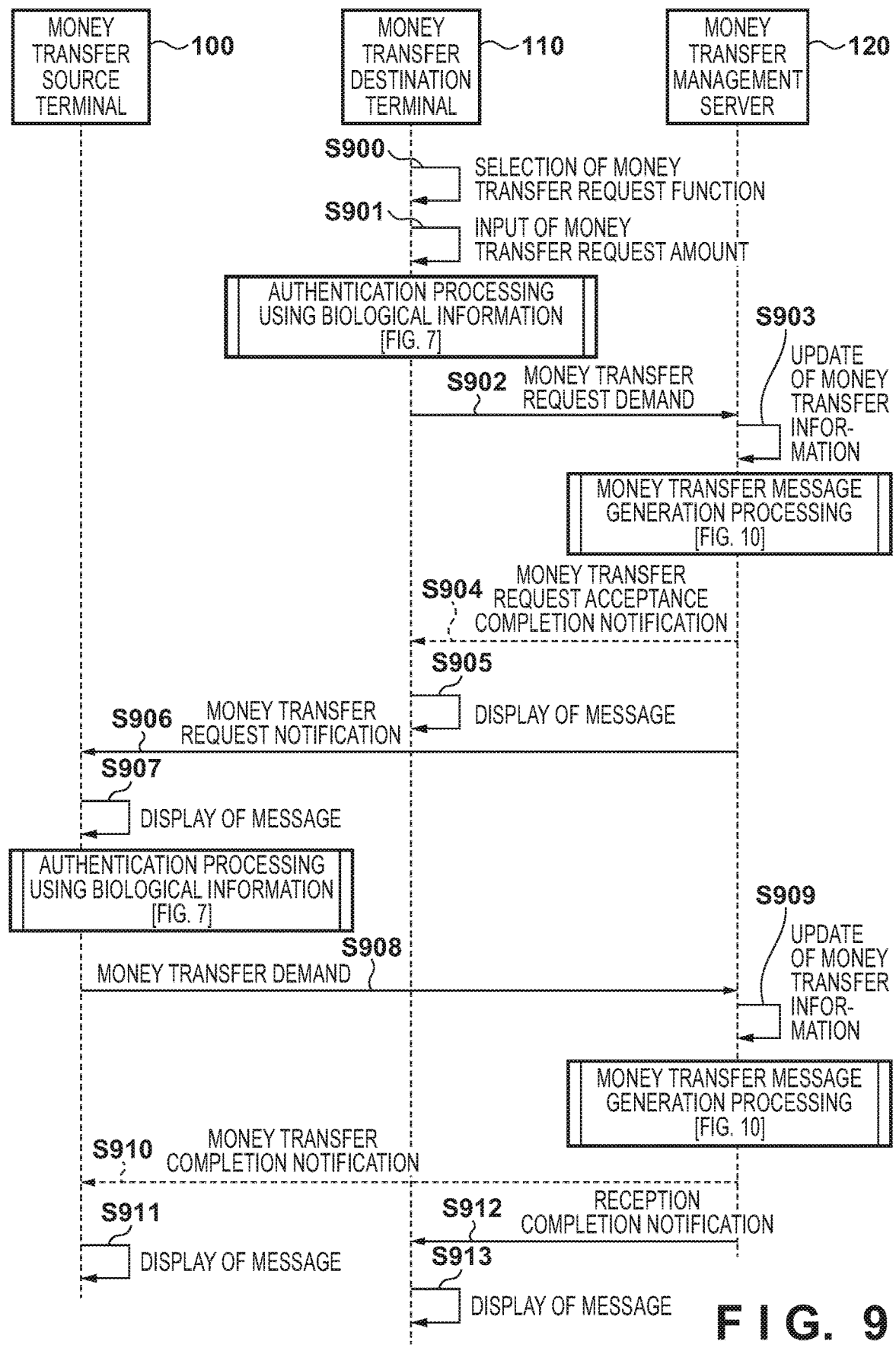
FIG. 9 is a sequence chart showing a sequence from money transfer request processing to money transfer processing according to the first embodiment.

FIG. 9 is a sequence chart showing a sequence from the money transfer request processing by the money transfer destination terminal 110 to the money transfer processing by the money transfer source terminal 100 according to the embodiment. As a precondition, the money transfer source user and the money transfer destination user execute the biological information registration processing sequence shown in FIG. 6 before executing this processing.

Assume that each process is implemented when the CPU of the money transfer source terminal 100, the money transfer destination terminal 110, or the money transfer management server 120 reads out the program stored in the ROM or the like and executes it.

In S900, when the money transfer destination user taps the money transfer request button 501 of the menu selection screen shown in FIG. 5A, the money transfer request amount input screen shown in FIG. 5G is displayed on the touch panel 209 of the money transfer destination terminal 110.

In S901, the money transfer destination user inputs a money transfer request amount to the money transfer request amount input region 560 in the money transfer request amount input screen (FIG. 5G), and selects a money transfer destination user in the money transfer request destination selection region 561. Subsequently, when the money transfer destination user taps the next button 562, the biological authentication screen (FIG. 5B) is displayed on the touch panel 209 of the money transfer destination terminal 110. Note that in this embodiment, the money transfer source user inputs "12,000 yen" to the money transfer request amount input region 560, and selects "money transfer source user (send-user)" in the money transfer request destination selection region 561. With this operation, the biological authentication sequence described with reference to FIG. 7 is executed.

If the biological authentication sequence is normally completed, the communication unit 431 of the money transfer terminal application 430 of the money transfer destination terminal 110 issues, in S902, a money transfer request demand to the money transfer management server 120. At this time, the money transfer request demand includes, as parameters, the money transfer request amount input in S901, the money transfer source user ID, and the token obtained in the sequence shown in FIG. 7.

In S903, the communication unit 461 of the money transfer management service 460 of the money transfer management server 120 receives the money transfer request demand sent from the money transfer destination terminal 110. Subsequently, the money transfer information control unit 463 updates the information of the money transfer information table in the money transfer information DB 470. Table 5 shows the state of the money transfer information table at the time of completion of S903.

TABLE 5

| Money Transfer Information ID | Money Transfer Source User ID | Money Transfer Destination User ID | Amount | Status |
|---|---|---|---|---|
| E1001 | send-user | receive-user | 12,000 | money transfer request in progress |
| ... | ... | ... | ... | ... |

In Table 5, the money transfer source user ID column stores "send-user" as the money transfer source user ID included in the money transfer request demand. The money transfer destination user ID column stores "receive-user" that is the ID of the money transfer destination user as the user of the token included in the money transfer request demand. The amount column stores the money request amount in the money request processing. Note that in this embodiment, "12,000" as the money transfer request amount included in the money transfer request demand is stored. The status column stores "money transfer request in progress" at the time of completion of S903 since the money transfer request has been made.

After that, to generate a message for notifying the money transfer source terminal 100 and the money transfer destination terminal 110 that the money transfer request has been made, the processing shown in FIG. 10 is executed. Note that this embodiment will provide the following description by assuming that, after the processing in S903, it is determined in step S1000 of FIG. 10 that the type of the money transfer processing is "money transfer request demand" and it is determined in step S1007 that identity verification has been performed.

In S904, the communication unit 461 of the money transfer management service 460 returns a money transfer request acceptance completion notification to the money transfer destination terminal 110. The money transfer request acceptance completion notification includes the request source message added with the text "identity verification has been done", that has been generated in FIG. 10, and the money transfer information ID generated in S903.

In S905, the communication unit 431 of the money transfer terminal application 430 of the money transfer destination terminal 110 receives the money transfer request acceptance completion notification from the money transfer management server 120. Furthermore, the message control unit 432 displays the request source message 570 of the money transfer request message screen shown in FIG. 5H on the touch panel 209 of the money transfer destination terminal 110.

In S906, the communication unit 461 of the money transfer management service 460 of the money transfer management server 120 sends a money transfer request notification to the money transfer source terminal 100. The money transfer request notification includes the request destination message added with the text "identity verification has been done", that has been generated in FIG. 10, and the money transfer information ID generated in S903.

In S907, the communication unit 401 of the money transfer terminal application 400 of the money transfer source terminal 100 receives the money transfer request notification from the money transfer management server 120. Furthermore, the message control unit 402 displays the request source message 580 of the money transfer response message screen shown in FIG. 5I on the touch panel 209 of the money transfer source terminal 100. By confirming the text "identity verification has been done" of the request source message 580, the money transfer destination user can be assured that the money transfer destination user has performed biological authentication and then made the money transfer request. Subsequently, when the money transfer source user taps the request source message 580, the biological authentication screen shown in FIG. 5B is displayed on the touch panel 209 of the money transfer source terminal 100. After that, the biological authentication sequence shown in FIG. 7 is executed.

In S908, the communication unit 401 of the money transfer terminal application 400 of the money transfer source terminal 100 issues a money transfer demand to the money transfer management server 120. At this time, the money transfer demand includes, as parameters, the money transfer information ID received in S907 and the token obtained in the sequence shown in FIG. 7.

In S909, the communication unit 461 of the money transfer management service 460 of the money transfer management server 120 receives the money transfer demand sent from the money transfer source terminal 100. Subsequently, the money transfer information control unit 463 updates the information of the money transfer information table in the money transfer information DB 470. Table 6 shows the state of the money transfer information table at the time of completion of S909.

TABLE 6

| Money Transfer Information ID | Money Transfer Source User ID | Money Transfer Destination User ID | Amount | Status |
|---|---|---|---|---|
| E1001 | send-user | receive-user | 12,000 | received |
| ... | ... | ... | ... | ... |

In Table 6, the money transfer information control unit 463 of the money transfer management service 460 searches for, from the money transfer information ID column, information whose money transfer information ID matches that included in the money transfer demand, and updates the status column of the matching money transfer information to "received".

After that, to generate a message for notifying the money transfer source terminal 100 and the money transfer destination terminal 110 that money transfer has been performed, the processing shown in FIG. 10 is executed. Note that this embodiment will provide the following description by assuming that, after the processing in S909, it is determined in step S1000 of FIG. 10 that the type of the money transfer processing is "money transfer demand" and it is determined in step S1007 that "identity verification has been performed".

In S910, the communication unit 461 of the money transfer management service 460 of the money transfer management server 120 sends a money transfer completion notification to the money transfer source terminal 100. The money transfer completion notification includes the money transfer source message added with the text "identity verification has been done", that has been generated in FIG. 10.

In S911, the communication unit 401 of the money transfer terminal application 400 of the money transfer source terminal 100 receives the money transfer completion notification from the money transfer management server 120. Furthermore, the message control unit 402 displays the request destination message 581 of the money transfer response message screen shown in FIG. 5I on the touch panel 209 of the money transfer source terminal 100.

In S912, the communication unit 461 of the money transfer management service 460 of the money transfer management server 120 sends a reception completion notification to the money transfer destination terminal 110. The reception completion notification includes the money transfer destination message added with the text "identity verification has been done", that has been generated in FIG. 10.

In S913, the communication unit 401 of the money transfer terminal application 400 of the money transfer destination terminal 110 receives the reception completion notification from the money transfer management server 120. Furthermore, the message control unit 402 displays the request destination message 571 of the money transfer request message screen shown in FIG. 5H on the touch panel 209 of the money transfer destination terminal 110. By confirming the text "identity verification has been done" of the request destination message 571, the money transfer destination user can be assured that the money transfer source user has performed biological authentication and then performed money transfer. Then, this processing sequence ends.

Note that the example in which one user is set as the money transfer request sending source and the money transfer destination has been explained. However, the present invention is not limited to this. For example, the present invention may be applied to an arrangement in which money transfer to the third party may be requested by a money transfer request.

With the sequence shown in FIG. 9, the sequence from the money transfer request processing by the money transfer destination terminal 110 to the money transfer processing by the money transfer source terminal 100 is completed. The money transfer source user and the money transfer destination user can make a money transfer request and perform money transfer after performing identity verification of one another by only performing operations on the terminals. Therefore, it is possible to reduce inhibition against the online money transfer request function while achieving high usability.

According to this embodiment, the money transfer source user and the money transfer destination user complete money transfer-related operations after performing identity verification of one other while improving the convenience for both the users. This makes it possible to eliminate user's concerns when using the online money transfer function and money transfer request function, and reduce inhibition against these functions.

Second Embodiment

As the second embodiment of the present invention, a form in which a money transfer request is made after obtaining a face photo of a money transfer destination user will be described. The first embodiment provides a form in which the money transfer source user and the money transfer destination user perform identity verification of one another by confirming the message "identity verification has been done", and then perform the money transfer-related operation. However, for example, in a case in which the money transfer destination user who has made a money transfer request and the money transfer source user who performs money transfer have not contacted each other for a long time, even if a money transfer request is made, the money transfer source user may not remember the money transfer destination user. In this case, even if identity verification is performed, it is impossible to recognize who is the user, and thus inhibition against a money transfer-related function is not reduced. This embodiment has been made in consideration of the above problem, and provides a form in which a face photo of the money transfer destination user is obtained at the time of making a money transfer request, and a money transfer request is made by adding the obtained face photo (face image).

[User Interface]

FIGS. 11A to 11E are views showing examples of the arrangements of the UIs of a money transfer source terminal 100 and a money transfer destination terminal 110 according to this embodiment. Note that a description of a screen arrangement common to the first embodiment will be omitted.

Figure 11A:
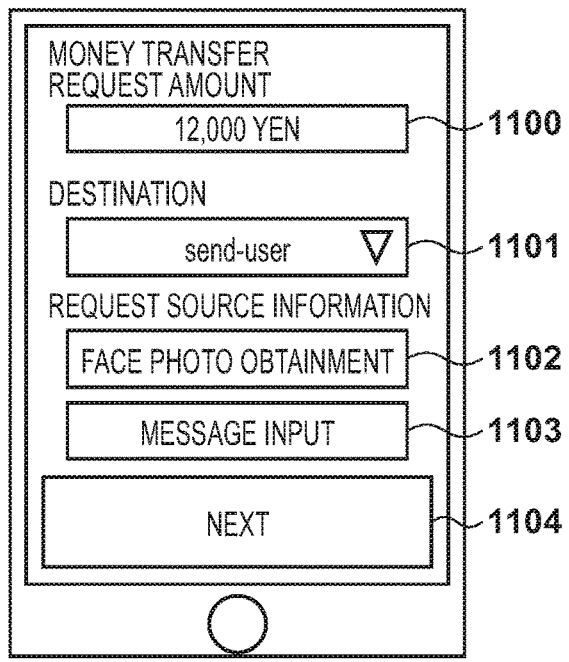
FIGS. 11A to 11E are views showing examples of the UIs of a money transfer source terminal and a money transfer destination terminal according to the second embodiment.

A money transfer request information input screen shown in FIG. 11A is a screen used by the money transfer destination user to input money transfer request-related information to a money transfer source user, and is drawn on a touch panel 209 of the money transfer destination terminal 110. A money transfer request amount input region 1100 and a money transfer request destination selection region 1101 are the same as the money transfer request amount input region 560 and the money transfer request destination selection region 561 of FIG. 5G, respectively, and a description thereof will be omitted. If a face photo obtaining button 1102 is tapped, the screen transits to a face photo obtaining screen shown in FIG. 11C. If a message input button 1103 is tapped, the screen transits to a money transfer request message input screen shown in FIG. 11B. A next button 1104 is the same as the next button 562 shown in FIG. 5G and a description thereof will be omitted.

Figure 11B:
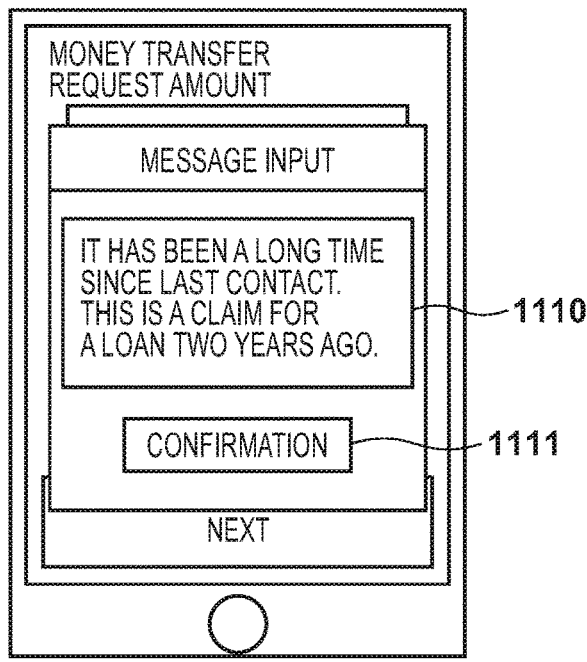

The money transfer request message input screen shown in FIG. 11B is a screen for inputting a message to be added to a money transfer request, and is drawn on the touch panel 209 of the money transfer destination terminal 110. A money transfer request message input region 1110 is a region for inputting a money transfer request message. If a confirmation button 1111 is tapped, the message input to the money transfer request message input region 1110 is confirmed, and the screen returns to the money transfer request information input screen shown in FIG. 11A.

Figure 11C:
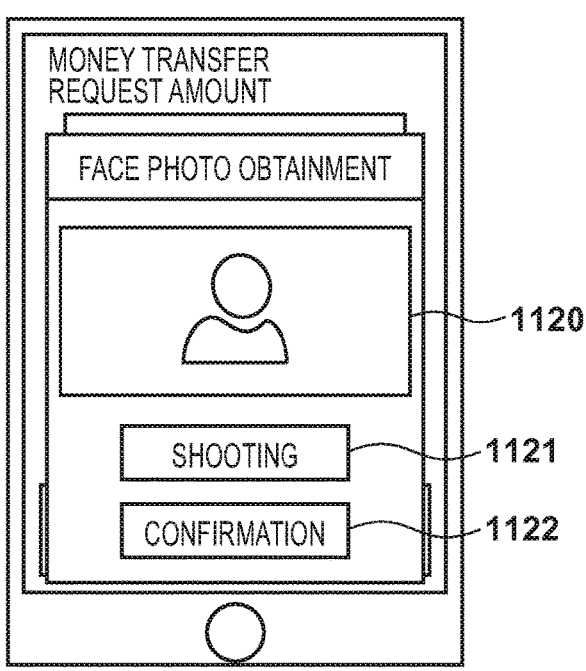

A face photo obtaining screen shown in FIG. 11C is a screen for obtaining a face photo to be added to a money transfer request, and is drawn on the touch panel 209 of the money transfer destination terminal 110. A shooting result display region 1120 is a screen showing a shooting result. If a shooting button 1121 is tapped, a shooting operation is performed by a camera (not shown) attached to the terminal, and a shooting result is displayed in the shooting result display region 1120. If a confirmation button 1122 is tapped, the face photo data displayed in the shooting result display region 1120 is confirmed, and the screen returns to the money transfer request information input screen shown in FIG. 11A.

Figure 11D:
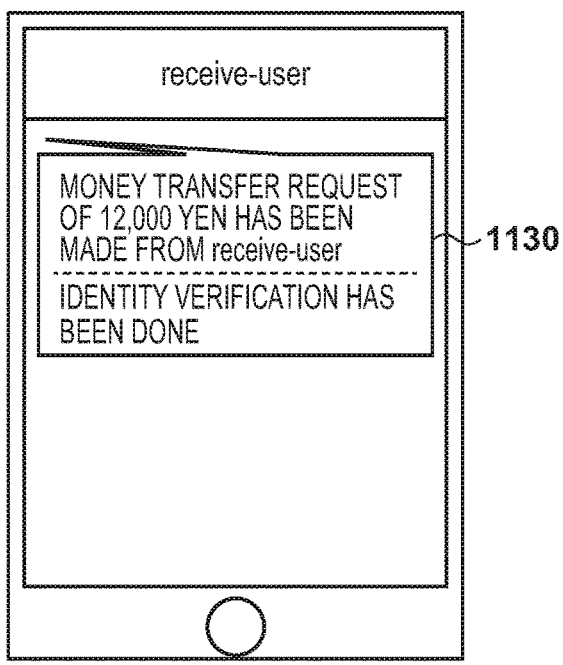

A money transfer response message screen shown in FIG. 11D is a screen on which processing associated with the money transfer request of the money transfer source user is displayed in a timeline message form, and is drawn on a touch panel 209 of the money transfer source terminal 100 when the money transfer destination terminal 110 makes a money transfer request. If a request source message 1130 is tapped, the screen transits to a money transfer request information confirmation screen shown in FIG. 11E.

Figure 11E:
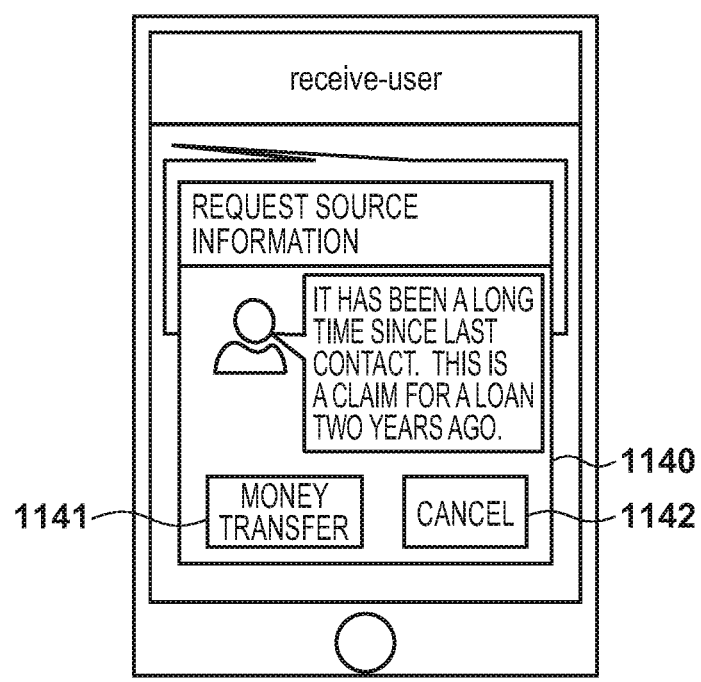

The money transfer request information confirmation screen shown in FIG. 11E is a screen for confirming information input by the money transfer request source user, and is drawn on the touch panel 209 of the money transfer source terminal 100. In a money transfer request information display region 1140, the money transfer request message input by the money transfer request source user and the obtained face photo are displayed. If a money transfer button 1141 is tapped, the screen transits to a biological authentication screen shown in FIG. 5B to perform money transfer. If a cancel button 1142 is tapped, the screen returns to the money transfer response message screen shown in FIG. 11D without performing money transfer.

[Money Transfer Request Processing and Reception Processing]

Figure 12:
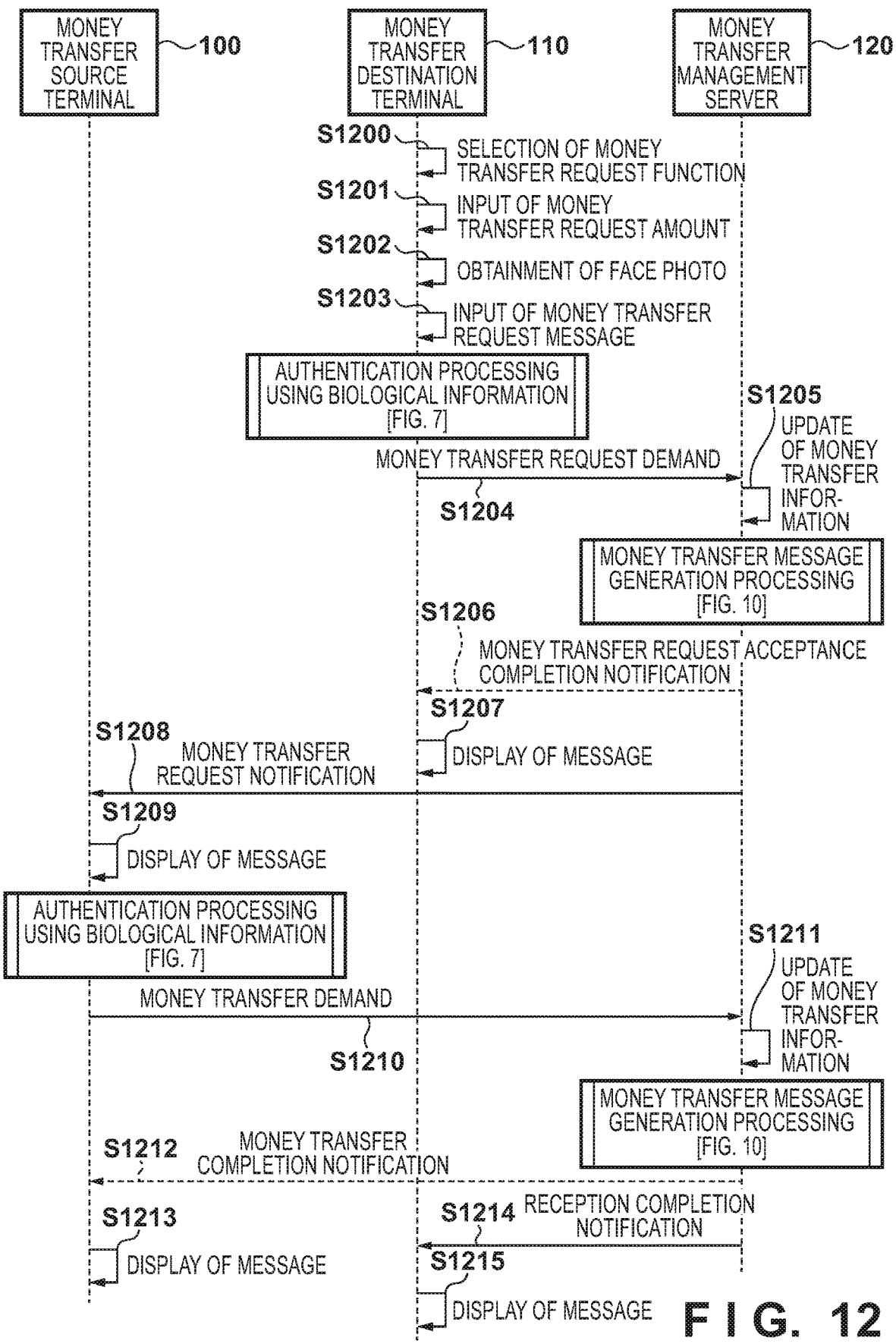
FIG. 12 is a sequence chart showing a sequence from money transfer request processing to money transfer processing according to the second embodiment.

FIG. 12 is a sequence chart showing a sequence from money transfer request processing by the money transfer destination terminal 110 to money transfer processing by the money transfer source terminal 100 according to this embodiment. As a precondition, the money transfer source user and the money transfer destination user execute biological information registration processing sequence shown in FIG. 6 before executing this processing.

Assume that each process is implemented when the CPU of the money transfer source terminal 100, the money transfer destination terminal 110, or a money transfer management server 120 reads out a program stored in a ROM or the like and executes it.

In S1200, when the money transfer destination user taps a money transfer request button 501 of a menu selection screen shown in FIG. 5A, the money transfer request information input screen shown in FIG. 11A is displayed on the touch panel 209 of the money transfer destination terminal 110.

In S1201, the money transfer destination user inputs a money transfer request amount to the money transfer request amount input region 1100 on the money transfer request information input screen shown in FIG. 11A, and selects a money transfer destination user in the money transfer request destination selection region 1101. In this example, assume that "12,000 yen" is input as a money transfer request amount and "send-user" is designated as a money transfer request destination.

In S1202, the money transfer destination user taps the face photo obtaining button 1102 of the money transfer request information input screen shown in FIG. 11A, thereby causing the screen to transit to the face photo obtaining screen shown in FIG. 11C. Furthermore, the money transfer destination user performs processing of obtaining a face photo by tapping the shooting button 1121 of the face photo obtaining screen shown in FIG. 11C, and then taps the confirmation button 1122.

In S1203, the money transfer destination user taps the message input button 1103 of the money transfer request information input screen shown in FIG. 11A, thereby causing the screen to transit to the money transfer request message input screen shown in FIG. 11B. Furthermore, the money transfer destination user inputs a money transfer request message to the money transfer request message input region 1110 of the money transfer request message input screen shown in FIG. 11B, and then taps the confirmation button 1111. This causes the screen to return to the money transfer request information input screen shown in FIG. 11A. Note that the procedure of the processes in S1201 to S1203 is not limited to this, and may be swapped. Each process may be re-executed for modification. Subsequently, when the next button 1104 shown in FIG. 11A is tapped, the biological authentication screen shown in FIG. 5B is displayed on the touch panel 209 of the money transfer destination terminal 110. After that, a biological authentication sequence shown in FIG. 7 is executed based on a user operation.

In S1204, a communication unit 431 of a money transfer terminal application 430 of the money transfer destination terminal 110 issues a money transfer request demand to the money transfer management server 120. At this time, the money transfer request demand includes, as parameters, the money transfer request amount input in S1201, the money transfer request message input in S1202, the face photo data obtained in S1203, a money transfer source user ID, and a token obtained in the sequence shown in FIG. 7.

Processes in S1205 to S1207 are the same as S903 to S905 of FIG. 9 described in the first embodiment and a description thereof will be omitted.

In S1208, a communication unit 461 of a money transfer management service 460 of the money transfer management server 120 sends a money transfer request notification to the money transfer source terminal 100. The money transfer request notification includes a request destination message added with a text "identity verification has been done", that has been generated in FIG. 10, a money transfer information ID generated in S1203, the money transfer request message sent in S1204, and the face photo data.

In S1209, a communication unit 401 of a money transfer terminal application 400 of the money transfer source terminal 100 receives the money transfer request notification from the money transfer management server 120. Furthermore, a message control unit 402 displays the request source message 1130 of the money transfer response message screen shown in FIG. 11D on the touch panel 209 of the money transfer source terminal 100. By confirming the text "identity verification has been done" of the request source message 1130, the money transfer destination user can be assured that the money transfer destination user has performed biological authentication and then made a money transfer request.

Subsequently, the money transfer source user taps the request source message 1130, thereby causing the screen to transit to the money transfer request information confirmation screen shown in FIG. 11E. When the money transfer source user confirms the money transfer request information confirmation screen shown in FIG. 11E, and then taps the money transfer button 1141, the biological authentication screen shown in FIG. 5B is displayed on the touch panel 209 of the money transfer source terminal 100. This allows the money transfer source user to confirm the face photo of the money transfer destination user and the money transfer request message on the money transfer request information confirmation screen shown in FIG. 11E. Therefore, even if the money transfer source user does not remember the money transfer destination user, he/she may be able to recall the money transfer destination user.

Processes in S1210 to S1215 are the same as those in S908 to S913 of FIG. 9 described in the first embodiment and a description thereof will be omitted.

According to this embodiment, the sequence from the money transfer request processing by the money transfer destination terminal 110 to the money transfer processing by the money transfer source terminal 100 is completed.

According to this embodiment, there can be provided a form in which a money transfer request is made after obtaining a face photo of a money transfer destination user. As compared to the first embodiment, it is possible to eliminate user's concerns when using an online money transfer function and money transfer request function, and reduce inhibition against these functions.

Third Embodiment

As the third embodiment of the present invention, a form in which if an amount exceeds a threshold at the time of performing money transfer or making a money transfer request, authentication other than biological authentication is prevented from being performed will be described.

The first embodiment has explained the form in which the money transfer source user and the money transfer destination user perform identity verification of one another by confirming the message "identity verification has been done", and then perform the money transfer-related operation. Execution of authentication by a password is also plausible in consideration of performing the operation by a user who has inhibition against biological authentication. However, since no biological authentication is performed, if the money transfer source terminal 100 or the money transfer destination terminal 110 is taken by a malicious user and a password is found, great damage is concerned. This embodiment has been made in consideration of the above problem, and aims at minimizing damage by providing a form in which if a specific amount is exceeded at the time of performing money transfer or making a money transfer request, authentication other than biological authentication is prevented from being performed.

[User Interface]

FIG. 13 is a view showing examples of the arrangements of the UIs of a money transfer source terminal 100 and a money transfer destination terminal 110 according to this embodiment. A biological authentication screen with limitation shown in FIG. 13 is a screen used by money transfer terminal application 400 or 430 of the money transfer source terminal 100 or the money transfer destination terminal 110 to obtain authentication information in order to use various money transfer functions, and is drawn on a touch panel 209 of each terminal. A biological information input instruction region 1310 and a cancel button 1311 are the same as the biological information input instruction region 510 and the cancel button 511 of FIG. 5B and a description thereof will be omitted. A password authentication button 1312 is in a tapping disable state. That is, authentication processing by a password is prohibited. In this state, even if the password authentication button 1312 is tapped, no processing is particularly performed.

In this embodiment, if a value larger than a specific threshold (upper limit value) is input to a money transfer amount input region 530 of a money transfer amount input screen shown in FIG. 5D and a next button 532 is then tapped, the screen transits to the biological authentication screen with limitation shown in FIG. 13. On the other hand, if a value equal to or smaller than the specific threshold is input to the money transfer amount input region 530 and the next button 532 is then tapped, the screen transits to a biological authentication screen shown in FIG. 5B. The above operation is also performed in a money transfer request amount input screen shown in FIG. 5G, and the screen transition destination is switched in accordance with an amount in a money transfer request amount input region 560. Note that, for example, 100,000 yen can be set as the specific threshold, and the user may be able to arbitrarily set the threshold.

While the password authentication button 1312 is displayed in the tapping disable state, a message representing that the input amount exceeds the specific threshold may be displayed to the user. In addition, information indicating that an authentication method is changed in accordance with a money transfer amount or information about the specific threshold may be displayed on a money transfer request information input screen shown in FIG. 5A or the like.

According to this embodiment, if a specific amount is exceeded at the time of performing money transfer or making a money transfer request, control is executed to prevent authentication other than biological authentication from being performed. With this arrangement, in this embodiment, it is possible to improve safety when using the online money transfer function and money transfer request function while maintaining user convenience for the money transfer function and money transfer request function.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-216551, filed Nov. 9, 2017, which is hereby incorporated by reference herein in its entirety.

What is claimed is:

1. A management system that manages information pertaining to money transfer according to a money transfer instruction in cooperation with a social network service, and manages, in association with each other, account information for the social network service and a public key corresponding to a private key held in a storage unit of a terminal of a user identified by the account information, the management system comprising:
   at least one processor configured to execute computer-executable instructions stored in memory, wherein the computer-executable instructions cause the management system to:
   send, for the money transfer instruction by the user to another user, data for authentication processing to the terminal of the user;
   receive signature data created using the private key in association with biological information of the user and the data for the authentication processing, when the authentication processing using the biological information of the user succeeds on the side of the terminal of the user;

verify, using the public key for the account information of the user, signature data;

issue a token to the terminal of the user according to a result of the verification of the signature data;

receive the money transfer instruction including the issued token;

generate, in accordance with a reception of the money transfer instruction, a message related to the money transfer; and provide the generated message.

2. The system according to claim 1, wherein the management system further manages information pertaining to money transfer according to a money transfer request instruction in cooperation with the social network service, and wherein the computer-executable instructions further cause the management system to:

send other data for the authentication processing to the terminal of the user for the money transfer request instruction to another user;

receive signature data created using the private key in association with biological information of the user and the other data, when the authentication processing using the biological information of the user succeeds on the side of the terminal of the user;

verify, using the public key for the account information of the user, the received signature data; and issue a token to the terminal of the user according to a result of the verification of the signature data, wherein, in accordance with the reception of the money transfer request instruction including the issued token, the message is generated.

3. The system according to claim 1, wherein the message includes information representing that identity verification has been performed.

4. The system according to claim 1, wherein the computer-executable instructions further causer the management system to obtain a face image of the user when accepting an instruction related to money transfer of the user, wherein the message further includes the face image.

5. The system according to claim 1, wherein the storage unit has a tamper resistance in the terminal of the user.

6. A method for a management system that manages information pertaining to money transfer according to a money transfer instruction in cooperation with a social network service and manages, in association with each other, account information for the social network service and a public key corresponding to a private key held in a storage unit of a terminal of a user identified by the account information, the method comprising:

sending, for the money transfer instruction by the user to another user, data for authentication processing to the terminal of the user;

receiving signature data created using the private key in association with biological information of the user and the data for the authentication processing, when the authentication processing using the biological information of the user succeeds on the side of the terminal of the user;

verifying, using the public key for the account information of the user, the received signature data;

issuing a token to the terminal of the user according to a result of the verification of the signature data;

receiving the money transfer instruction including the issued token;

generating, in accordance with a reception of the money transfer instruction, a message related to the money transfer; and providing the generated message.

* * * * *